March 24, 1959

A. SNIJDERS

ELECTRONIC TRANSMITTER AND RECEIVER FOR SIGNALS IN A START-STOP CODE 2,879,334

Filed March 18, 1953

8 Sheets-Sheet 1

INVENTOR:
ANTONIE SNIJDERS.
BY Hugh A. Kirk
ATTY.

INVENTOR:
ANTONIE SNIJDERS
BY
Hugh A Kirk
ATTY.

March 24, 1959 — A. SNIJDERS — 2,879,334

ELECTRONIC TRANSMITTER AND RECEIVER FOR SIGNALS IN A START-STOP CODE

Filed March 18, 1953 — 8 Sheets-Sheet 3

INVENTOR:
ANTONIE SNIJDERS.
BY Hugh A. Kirk
ATTY.

March 24, 1959 A. SNIJDERS 2,879,334
ELECTRONIC TRANSMITTER AND RECEIVER FOR SIGNALS IN A START-STOP CODE Filed March 18, 1953 8 Sheets-Sheet 4

INVENTOR:
ANTONIE SNIJDERS.
BY
Hugh A. Kirk
ATTY.

March 24, 1959 A. SNIJDERS 2,879,334
ELECTRONIC TRANSMITTER AND RECEIVER FOR SIGNALS IN A START-STOP CODE
Filed March 18, 1953
8 Sheets-Sheet 5
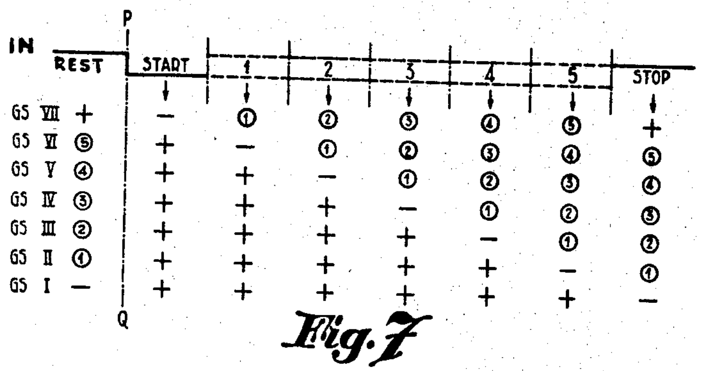
Fig. 7
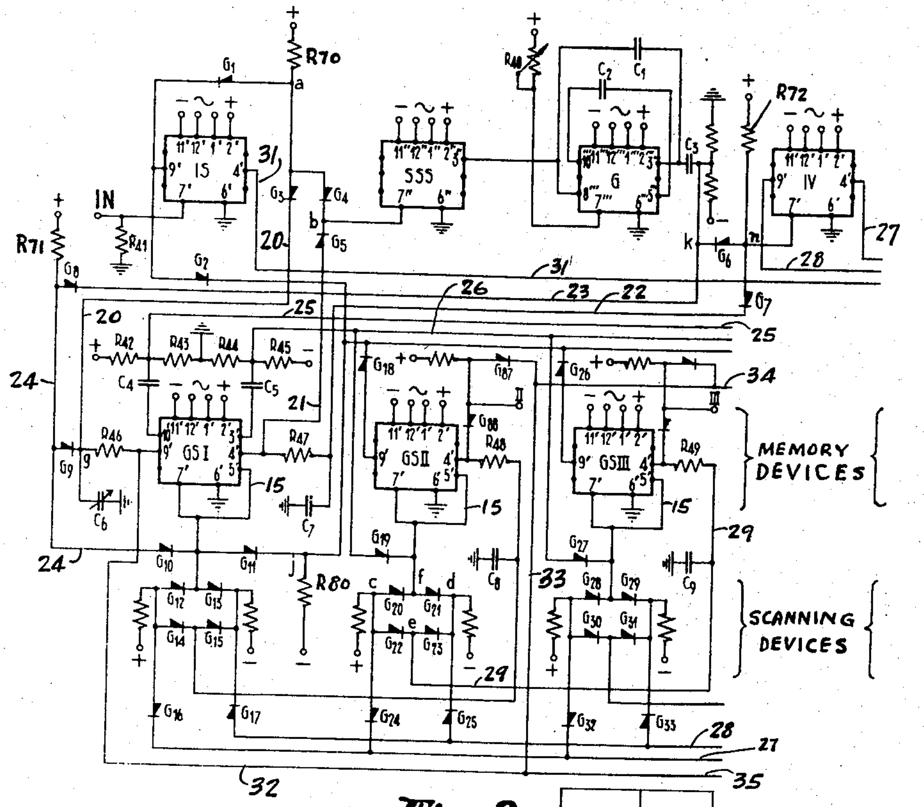
Fig. 8
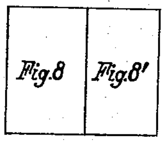
RECEIVER
INVENTOR:
ANTONIE SNIJDERS
BY Hugh A. Kirk
ATTY.

March 24, 1959

A. SNIJDERS

ELECTRONIC TRANSMITTER AND RECEIVER FOR SIGNALS IN A START-STOP CODE 2,879,334

Filed March 18, 1953

8 Sheets-Sheet 6

INVENTOR:
ANTONIE SNIJDERS
BY Hugh A. Kirk
ATTY.

March 24, 1959

A. SNIJDERS

ELECTRONIC TRANSMITTER AND RECEIVER FOR SIGNALS IN A START-STOP CODE 2,879,334

Filed March 18, 1953

8 Sheets-Sheet 7

| | REST | START | 1 | 2 | 3 | 4 | 5 | STOP |
|---|---|---|---|---|---|---|---|---|
| 55I | + | − | ① | ② | ③ | ④ | ⑤ | + |
| 55II | − | ① | ② | ③ | ④ | ⑤ | + | − |
| 55III | − | ② | ③ | ④ | ⑤ | + | − | − |
| 55IV | − | ③ | ④ | ⑤ | + | − | − | − |
| 55V | − | ④ | ⑤ | + | − | − | − | − |
| 55VI | − | ⑤ | + | − | − | − | − | − |
| 55VII | − | + | − | − | − | − | − | − |

INVENTOR:
ANTONIE SNIJDERS.
BY Hugh A Kirk
ATTY.

March 24, 1959 A. SNIJDERS 2,879,334

ELECTRONIC TRANSMITTER AND RECEIVER FOR SIGNALS IN A START-STOP CODE

Filed March 18, 1953

8 Sheets-Sheet 8

INVENTOR:
ANTONIE SNIJDERS.
BY Hugh A Kirk
ATTY.

United States Patent Office 2,879,334

Patented Mar. 24, 1959

2,879,334

ELECTRONIC TRANSMITTER AND RECEIVER FOR SIGNALS IN A START-STOP CODE

Antonie Snijders, The Hague, Netherlands, assignor to Staatsbedrijf der Posterijen, Telegrafie en Telefonie, The Hague, Netherlands Application March 18, 1953, Serial No. 343,015

Claims priority, application Netherlands March 20, 1952

31 Claims. (Cl. 178—53.1)

This invention relates to a completely or fully electronic communication system. More particularly, it deals with such an electronic system adapted for transmission, reception and/or regenerative repetition of start-stop multi-element telegraph code signals, such as for example a five-unit or element time-spaced binary code in which each code signal may also include at least one synchronizing element, such as a stop and/or start element.

This invention is a modification and an improvement of the system of Snijders prior co-pending application Serial No. 322,180, filed November 24, 1952, which is also a fully electronic communication system employing substantially the same types of basic or standard circuits but arranged in a different manner.

It is an object of this invention to produce a simple, efficient, effective and economic fully electronic communication system for receiving and/or transmitting multi-element code signals.

Another object is to produce such a system which contains fewer circuit elements and is simpler to construct than that of said prior co-pending Snijders application Serial No. 322,180.

Another object is to produce such a system without a distributor or counting circuit of the type employed in said co-pending Snijders application, which system still produces the same results as the system of said Snijders application.

Another object is to produce such a fully electronic system which contains less apparatus and a fewer number of electron tubes than the system previously known, thereby materially reducing the maintenance costs for the system.

Another object is to produce a fully electronic basic communication circuit which may be readily adapted for use in several different apparatus, including: (1) a transmitter to form the multi-element code signals from separate elements such as from a telegraphic code perforated tape; (2) a receiver to separate said elements from a code signal such as for the control of a telegraph code type printer; and (3) a regenerative repeater to separate and reform the said elements such as for long line code telegraph circuits.

Another object is to produce such a system which produces signals having very small distortion, and which is sufficiently sensitive to detect incoming signals having greater distortions than those normally capable of detection in many previously known systems, thereby permitting a fewer number of repeater circuits to be used in a given length of transmission line.

Another object is to produce such a system having a circuit which may be adjusted as to the time-length of one or more of its synchronizing elements, so as to automatically compensate for transmitters which transmit signals at too fast or too slow a rate.

Another object is to produce such a system having a circuit which ignores false starts or pulses by measuring the length of received pulses to insure that only start pulses of a predetermined duration will instigate the circuit.

Another object is to produce such a system which may be adapted to automatic telegraph networks, wherein five, six, seven or even more elements per signal are transmitted, received and/or automatically regenerated and repeated.

Another object is to produce such a system which may be employed in extensors in telegraph over radio (TOR) systems by storing signals for code conversion purposes and retransmitting them by a second extensor.

Another object is to produce such a system embodying a plurality of bi-stable trigger circuits in which at least a portion of said circuits are employed for dual functions and from which bilateral pulses are produced at spaced intervals.

Another object is to produce such a system having circuits which double the functions of previously known shifting registers of electronic computer circuits.

Another object is to produce such a system which may be employed in automatic telegraph systems wherein special calling and clearing signals made up of all the same polarity elements are to be communicated.

Another object is to produce such a communication system in which electronic relay cells are employed, such as those described in the Snijders co-pending application Serial No. 300,817, filed July 25, 1952. These electronic relays involve a plurality of rectifiers connected to a junction, all conducting in the same direction with respect to said junction, which junction may also be connected to a potential source through a low impedance, whereby the flow of current through a given one or more rectifiers from said junction may be controlled by the application of different potentials to other rectifiers connected to said junction.

Generally speaking, this invention can readily be adapted for a transmitter, a receiver, or a regenerative repeater for the detection of a plurality of consecutive elements of a multi-element code signal, determine their polarity, store or record said polarities in memory devices, and retransmit or pass the intelligence of these polarities on without distortion, substantially immediately after they are received or detected, or after each group of elements making a complete signal have been stored.

The code signals employed in the system of this invention are preferably composed of equally spaced elements, in which each signal contains the same number of elements, and each element may correspond to either a mark or a space, which may be indicated by either a positive or a negative potential, or vice versa. The first and/or last element of each signal may be a synchronizing element, and may be identified as start and stop elements, respectively, which elements always have opposite polarities. The intermediate elements, of which there may be five as in a teleprinter telegraph code signal, may correspondingly be either plus or minus (positive or negative) and may be used to convey the intelligence to be communicated by the signal. The system of this invention is so timed and synchronized that it detects or scans the pulses corresponding to each of these elements at substantially their centers thereby avoiding errors due to distortion of the leading or trailing edges of the pulse elements.

The general circuits common to both the transmitter and receiver including the regenerative repeater according to this invention comprise: a start-stop circuit, an impulse generator circuit controlled by the start-stop circuit, a series of memory devices one for each element of the signal, a series of electron relays arranged to provide gating and scanning devices, a pulse amplifier circuit operated by said generator for controlling simultaneously both said scanning and said shifting functions to control the operation of said memory devices, and additional interconnecting electron relay cells. Thus, the series of memory devices has a double function of both storing and shifting or counting successive elements of each signal thereby permitting the elimination of a separate distributor circuit as is required in said Snijders co-pending application Serial No. 322,180, filed November 24, 1952, now Patent No. 2,842,616.

The electronic circuits employed in carrying out these functions are of four different basic or standard types, namely: bi-stable trigger type circuits, a start-stop circuit, a multivibrator generator type circuit, and electron relay cells comprising rectifiers. The basic or standard bi-stable trigger type circuit may be connected in different ways in the system of this invention to provide pulse shapers, amplifiers, memory circuits and shifting circuits differing only in the manner in which their two cross-connected electron tubes have their output and input terminals connected. The start-stop and generator circuits also each contain two electron tubes, but these two circuits are connected together in such a way that the start-stop circuit controls the stopping and starting of the multivibrator, which multivibrator is provided with predetermined time-constant circuits for determining the regular intervals at which it instigates the scanning and triggering pulses while it is operating.

The electron relay cells are employed in connections between the various circuits and include in particular the gating and scanning circuits associated with each memory device employed in the system, as well as the locking circuits which prevent the erroneous triggering of the trigger circuits when the system is turned on or off before or after the operation of its communication functions. Other functions of the electron relay cells and circuits include (1) means for preconditioning the memory devices at the first of each signal for the proper storing of the signal elements of the communication in response to the first pulse from the generator before the memory or triggering circuit is operated; and (2) means to start and stop the generator through the means of start-stop circuits at the ends of each signal of the same number of elements.

The electron relay cells, as previously stated, comprise at least two rectifiers connected by conductors to a common junction or conductor, all of which rectifiers have the same direction of conductivity with respect to said junction, which conductivity may be either toward or away from said junction depending upon what potential is to be controlled. This junction, however, also may be connected to a fixed potential source through a low impedance, which fixed potential at said junction is then maintained or opposed by potentials applied to one or more of the rectifiers also connected to said junction, or the controlling potential at the junction may be applied through one of the two or more rectifiers which make up the relay cell.

In a receiver system the first start or synchronization pulse element of a signal received, if it is more than a predetermined duration, changes the state of an input amplifier circuit from its rest condition, which through pair of electronic relay cells starts a start-stop circuit to start a multivibrator generator and applies a start element potential to the input of the last memory device preparatory to being scanned and stored in said last memory device. The first operative impulse from the generator is applied via a couple of other electronic relay cells to the input of the first memory device to change it from its rest position into its operative state and simultaneously therewith change or pre-condition all of the other memory devices, i.e. setting all except the last memory device into a state opposite from that of the last memory device which is set according to the start element. After all the memory devices have thus been pre-conditioned by the first operative impulse from the generator, the remaining operative impulses from the generator for the duration of one cycle of operation of the system, or number of elements in one signal, are caused to operate an impulse amplifier circuit through another electron relay cell, for simultaneously producing both scanning and synchronizing impulses to operate the gating and scanning devices of two electron relay cells each corresponding to each of the memory devices, and to operate the shifting devices for simultaneously transferring the charge or state of a later memory device to a former memory device. These scanning and synchronizing impulses are timed to occur at approximately the centers of each of the elements of a received signal to thereby ignore any distortion of their leading or trailing edges. These generator impulses, thus, both trigger the last memory devices to successively store each signal element as it is received, and simultaneously transfer or shift its previously stored state forwardly to the next memory device, so that the state of the last memory device is thereby transferred to the next to the last memory device, and the state of the next to the last memory device is transferred simultaneously at that time to the second from the last memory device, and so on through the series of memory devices each time a new element of the signal is scanned and stored on the last memory device. Thus, after all of the elements of a signal have been received, the memory devices are then charged or put in states corresponding to all of said elements of that signal, and the start element has been stepped or shifted through the whole series of memory devices from the last to the first, at which time it changes the state of the first memory device back into its rest condition which operates the start-stop circuit to automatically stop the multivibrator generator until the start pulse of the next signal is received to start it again. This resetting of the first memory device through other electron relay cells prepares the memory devices containing the stored intelligence elements of the signal for detection or operation of a teleprinter recorder, or the like device. Additional electron relay cells may be provided in the receiver system in locking circuits to prevent the series of memory devices from being set-up or preconditioned in the wrong states before or after the reception of a signal after the system has been turned-on or energized, so that in the rest condition of the system the first memory device is always in its rest or inoperative state and the last memory device is always in its operative state.

In a regenerative repeater system, the same circuits may be employed as those for a receiver system, except the elements of the signal as they are received are then immediately retransmitted from the last memory device by the control of the impulses from the multivibrator generator, and the series of memory devices are then employed to count the number of elements in each signal and stop the generator at the end of each signal to produce the proper duration stop element for retransmission at the end of each signal.

In a transmitter system, the elements of the signal to be transmitted are first applied to the inputs of the intelligence element memory devices of the system, and then a separate start pulse of at least a predetermined duration is applied to an input circuit to change its state, which change through a pair of electronic relay cells changes the last memory device from its rest state into its operative or stop element condition or state. This separate start pulse element may be instigated by a teletypewriter or tape reader stepping mechanism, or the like, which may be employed in the transmission of telegraph code signals. The operation of the last memory device immediately and simultaneously pre-conditions the remaining memory devices of the series of memory devices in the system, triggering each of the intelligence element memory devices via separate electronic relay cells in accordance with the intelligence just applied to their inputs, and triggering the first memory device from its rest condition or state into the start element condition, so that all the memory devices are now conditioned according to the signal to be sent. This operation of the last memory device also through an amplifier or auxiliary start-stop circuit and a pair of electronic relay cells starts the start-stop circuit to start a multivibrator generator which then produces operative impulses that are applied to an impulse amplifier circuit that produces simultaneously therefrom both scanning and synchronizing impulses. The first of the impulses from the impulse amplifier shifts or transfers, via the scanning devices of two electronic relay cells each corresponding to each memory device, the states of each of the memory devices one step toward the first memory device, so that the first intelligence element is now stored thereon for transmission from the first memory device, since the start element previously stored thereon has now been transmitted therefrom. Simultaneously with this shifting, the last memory device is charged or conditioned back into its rest condition state corresponding to a start element in accordance with the potential scanned for it from the auxiliary start-stop circuit, which auxiliary circuit continues to be in this same state as long as the cycle for transmission of all of the elements in the signal continues. As soon as the stop element condition or state from the last memory device has stepped through the series of memory devices to the first memory device, and all of the other memory devices are in the same or start condition from the potential scanned from the auxiliary start-stop circuit, then the auxiliary start-stop circuit via an electron relay cell is cut-off, which in turn immediately stops the other start-stop circuit and the multivibrator generator. Accordingly, no more shifting occurs and the stop polarity of the last stop element of the signal continues to be transmitted until the start element of the next signal to be transmitted is applied to the system, and the condition of the first memory device is changed again from this rest or stop condition as described above. Here as in the receiver system, another electronic relay cell may be provided in a locking circuit to insure a stop element polarity condition for the first memory device connected to the transmitter output terminal, when the transmitter system is in its rest condition.

Thus, the receiver system has its series of memory devices successively changed from the last to the first memory device according to each element of the signal as it is received at the input of the last memory device, while the transmitter system has its series of memory devices pre-set according to the elements of the signal to be transmitted and then they are successively changed to the same state from the last to the first memory device while the states of the elements of the signal are thereby read out at the output terminal of the first memory device.

The above mentioned and other features and objects of this invention and the manner of attaining them are given more specific disclosure in the following description of embodiments of the invention taken in conjunction with the accompanying drawings, wherein:

Fig. 7 is a time chart of the charges, conditions or states of the memory devices GSI through GSVII from a state of rest through the detection of each element of a seven element code signal in a receiver system according to Figs. 8 and 8′;

Figure 1:
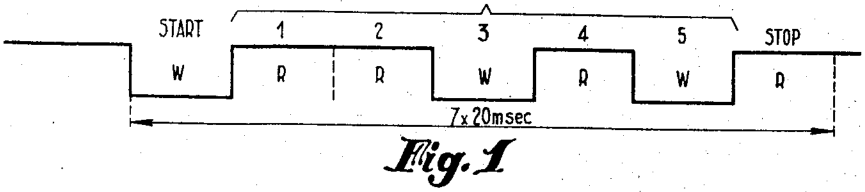
Fig. 1 is a wave diagram of a signal having five intelligence elements preceded by a start element of negative potential or polarity and followed by a stop element of positive potential or polarity.
Figure 8:
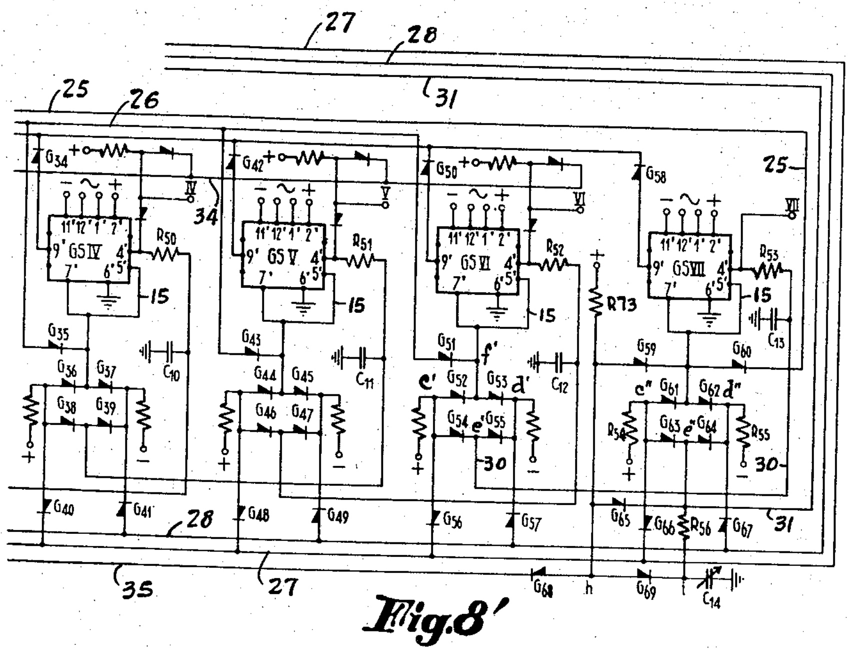
Figure 9:
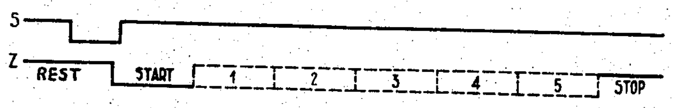
Figure 10:
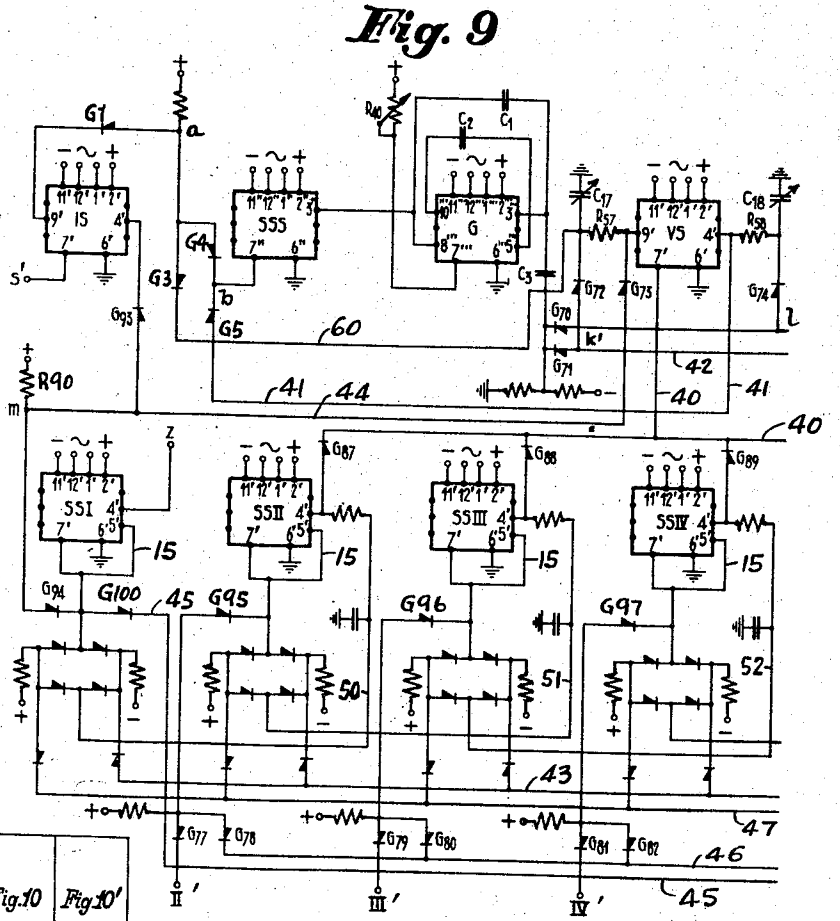
Figure 10:
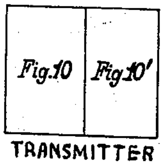
Figure 10:
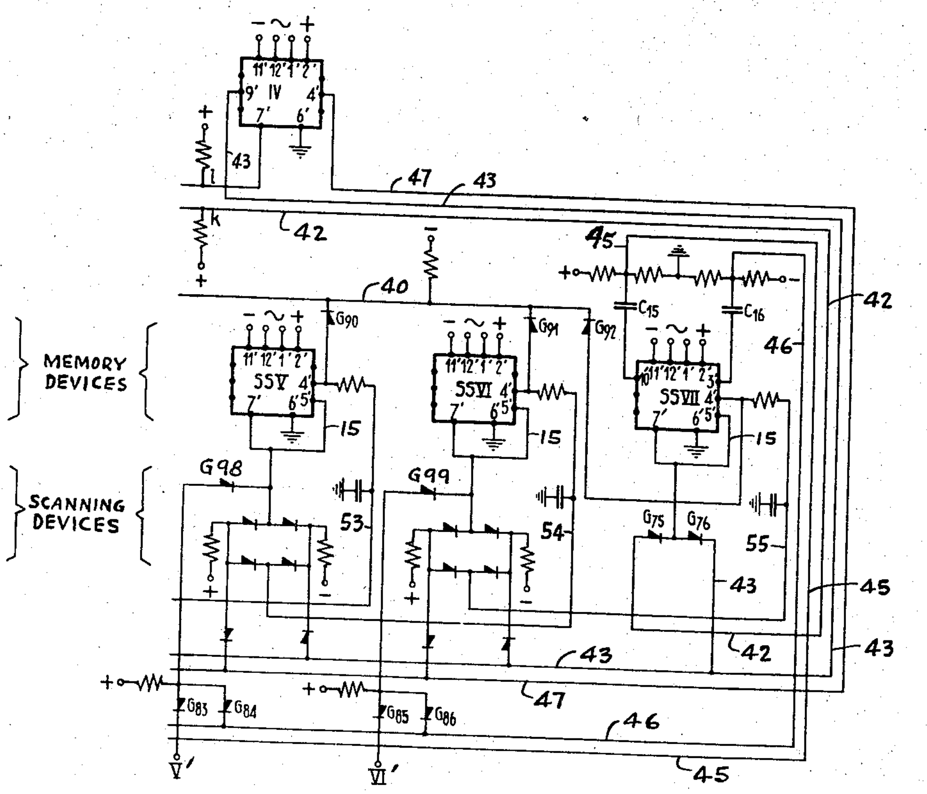

Figs. 8 and 8′ together comprise a schematic block and circuit diagram of a receiver system embodying the present invention and adapted for receiving a five unit start-stop telegraph code signal of the type shown in Figs. 1 and 7, and also for the regenerative repetition of said signal;

Fig. 9 is a time chart of the charges, conditions or states of the memory devices SSI through SSVII from a state of rest through start and the scanning and transmission of a seven element code signal by a transmitter system according to Figs. 10 and 10′; and Figs. 10 and 10′ together comprise a schematic block and circuit diagram of a transmitter system embodying the present invention and adapted for the transmission of a five unit start-stop telegraph code signal of the type shown in Figs. 1 and 9, and for use with the receiver system shown in Figs. 8 and 8′.

In order to illustrate this invention the following description by way of example is directed to systems for communicating telegraph code signals of marks and spaces, or of + and − polarity pulses, comprising seven equal time-spaced elements, which description will now be divided into chapters and sections according to the following outline:

I. The multi-element signal (Fig. 1)
II. Component circuits
  (1) General arrangement
  (2) Standard trigger circuit (Figs. 2 and 3)
  (3) Start-stop and generator circuits (Figs. 4, 5, 6)
III. A receiver system (Figs. 7, 8, 8′)
  (1) Rest condition and first locking circuit
  (2) Starting and pre-conditioning circuits
  (3) Scanning, shifting and storing circuits
  (4) Stopping and second locking circuit
IV. A transmitter system (Figs. 9, 10, 10′)
  (1) Rest condition and locking circuit
  (2) Starting and storing circuits
  (3) Scanning and shifting circuits
  (4) Stopping circuit

I. MULTI-ELEMENT SIGNAL

Referring to Fig. 1 a wave form of one complete start-stop code signal is graphically disclosed to be composed of seven elements, each of 20 milliseconds' duration, in which the first start or mark element is indicated as a negative pulse W and the seventh stop or space element is indicated as a positive pulse R, while the five intelligence elements 1, 2, 3, 4 and 5 may be either spaces R or marks W. The start and stop elements are of opposite polarity from each other. There is a preferred minimum limit for the duration of one complete signal, namely about 130 milliseconds, which duration may be controlled or adjusted by condensers or capacitors C6 or C17 (see Fig. 8 or 10, respectively). This control happens by adjusting the duration of the seventh, last or stop element, which can be varied from 10 milliseconds upward. After said duration the receiver is ready to receive the start element of a new signal and the transmitter is ready to transmit a new signal if a start signal is given. If such a new start element or start signal is not yet present, the stop element will be lengthened till the moment of appearance of a new start element or start signal, respectively. If this limit of 130 milliseconds were reduced more it would reduce the regenerative capacity of the system, particularly when used as a regenerative repeater. The start element or signal pulse must have a duration of at least 10 milliseconds before the system of this invention will respond. This feature also enables each of the intelligence signal elements to be scanned about 10 millseconds after their leading edges, or about in their centers which permits considerably more distortion of their pulse edges than could normally be tolerated in some previously known systems. Thus, the circuits of this invention are timed so that the first intelligence element is scanned 30 milliseconds after the leading edge of the start element of its corresponding signal.

II. COMPONENT CIRCUITS

(1) *General arrangement*

The general arrangement of the circuit elements or components of this invention for a receiver system is similar to that shown in Figs. 8 and 8′ and comprises:

(1) An incoming amplifier and/or shaper IS for the received pulses according to the wave form shown in Fig. 1, which sharpens the leading and trailing edges of each of the element pulses;

(2) A start-stop circuit SSS for starting and stopping the multivibrator or generator G;

(3) A multivibrator generator G, preferably having a 50 cycle oscillation rate to correspond with the 20 millisecond duration of each element in the signal of Fig. 1, which generator emits alternate positive and negative pulses each 10 milliseconds, only the positive pulses from which are employed with the first pulse of each cycle operating the first memory device GSI and the remaining pulses of each cycle being applied to the impulse amplifier IV;

(4) An impulse amplifier IV which causes, at the correct or the scanning moments, the polarities of the successive elements of the signal to determine the state of the last memory device GSVII and at the same time causes each of the other memory devices GSI through GSVI to take over the state of the preceding memory device;

(5) A series of seven memory devices GSI through GSVII of which: the first memory device GSI serves as a start circuit and an auxiliary start and stop circuit to control the generator G; the last memory device GSVII serves as a stop circuit and is the end circuit of the series to which each element of the signal received is first applied before being shifted to the next device toward the end of the first memory device; and memory devices GSII through GSVI serve as the intelligence storing circuits or memory devices for the intelligence elements 1 through 5 of the signal;

(6) A series of scanning devices each comprising a pair of electronic relay cells of three rectifiers each, and corresponding to each of the memory devices for triggering them in response to both the impulses from the impulse amplifier IV; and (7) Other electron relay cells of at least two rectifiers each, interconnecting and controlling many of the above circuits.

The general arrangement of the circuit components for a transmitter system according to that shown in Figs. 10 and 10′, comprises:

(1) An input circuit IS, similar to amplifier-shaper IS of the receiver of Fig. 8, but which circuit acts more as an auxiliary starting circuit;

(2) A start-stop circuit SSS identical in structure and operation to that of the receiver of Fig. 8 mentioned above;

(3) A multivibrator generator circuit G identical in structure and operation to that employed in the receiver of Fig. 8 mentioned above, except that its first positive impulse of each signal cycle is employed to operate the last memory device SSVII instead of the first memory device;

(4) An auxiliary amplifier VS which acts as an auxiliary starting and stopping circuit and controls by its state the impulses from the generator G and the conditioning of the last memory device SSVII;

(5) An impulse amplifier IV which at the correct moment controls the scanning and setting of the last memory circuit SSVII and the shifting of the states of the devices through to the transmitter output terminal Z connected to the first device SSI;

(6) A series of seven memory devices acting also as shifting circuits, similar in basic structure to the memory device circuits of the receiver, which devices SSI through SSVII store the states of each element of the signal to be transmitted at the beginning of the transmitting cycle and then pass or shift them successively to the output terminal Z on the first memory device SSI;

(7) A series of six scanning devices comprising electronic relay cells of three rectifiers each, corresponding to the first six memory devices SSI–SSVI for triggering them as mentioned above in the receiver system; and (8) Other electron relay cells of at least two rectifiers each for interconnecting and controlling many of the above circuits including the last memory device SSVII.

Next a detailed description and operation of the three basic electron tube containing circuits will be described.

(2) *Standard trigger circuit*

Figure 2:
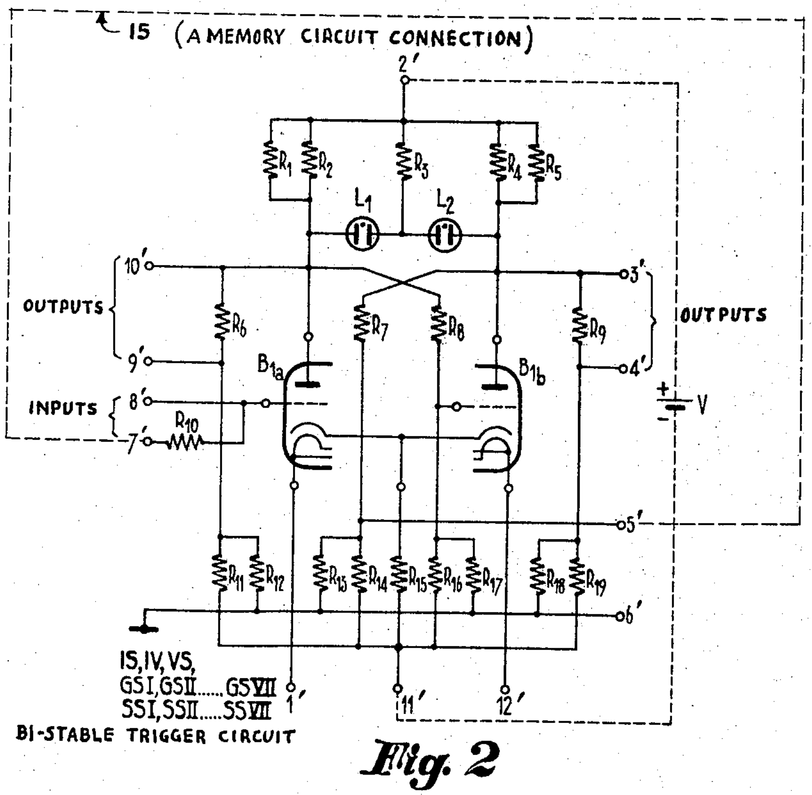
Fig. 2 is a wiring diagram of the standard bi-stable trigger or special flip-flop circuit with some of the different employed connections being shown in dotted lines, which trigger circuit is employed several times in the receiver circuit of Figs. 8 and 8′ at IS, IV and GSI through GSVII, and in the transmitter circuit of Figs. 10 and 10′ at IS, VS, IV and SSI through SSVII.

The shaper amplifier and input circuits IS, IV and VS and the memory circuits GSI–GSVII and SSI–SSVII are all standard trigger or flip-flop bi-stable circuits each having two possible states of equilibrium similar to that described in Snijders co-pending U.S. patent application Serial No. 300,817, filed July 25, 1952, however, a detailed wiring diagram of this trigger circuit is shown again here in Fig. 2.

This standard trigger circuit comprises a pair of electron tubes, such as double triodes B1*a* and B1*b* (which may be for example an E90CC tube), which are connected by means of a number of resistors, and may also contain a pair of neon indicator lamps L1 and L2 to indicate which one of the two tubes is conducting at any given time. These two tubes B1*a* and B1*b* have a common cathode resistor R15 which may be connected through a terminal 11′ to the negative pole of the battery V. The anode resistances of the tubes are connected respectively to parallel resistors R1/R2 and R4/R5 which then may be connected through a terminal 2′ to the positive pole of the battery V. Potentiometers R6/R11 and R9/R19 are connected from the anodes of the tubes B1*a* and B1*b*, respectively, to the negative pole of the battery V, with the taps or center points of these potentiometers between their respective pairs of resistors being connected to the output terminals 9′ and 4′, respectively, of the trigger circuit. Between these two output terminals 9′ and 4′ is connected a pair of resistors R12 and R18 in series with each other, which resistors may be of equal value, and the connection between them may be connected to another terminal 6′ of the trigger circuit, which generally in the systems of this invention is connected to a common ground maintained at a potential between the positive and the negative poles of the battery V. Also in this standard trigger circuit are two high ohmic potentiometers R8/R16 and R7/R14 connected from the respective anodes of the tubes B1*a* and B1*b* to the negative battery pole through the terminal 11′. These two potentiometers R8/R16 and R7/R14 are in parallel with the potentiometers R6/R11 and R9/R19 mentioned above. The tap to potentiometer R8/R16 is connected to the control grid of the tube B1*b* and also through a resistor R17 to the ground terminal 6′. The tap of the potentiometer R7/R14 is connected to the terminal 5′ and also through a resistor R13 to the same ground terminal 6′. The control grid of the tube B1*a* is directly connected to the input terminal 8' and may also be connected via a resistance R10 to another input terminal 7'. The anode of the tube B1a is directly connected to a terminal 10' and the anode of the tube B1b is directly connected to the terminal 3'. The gas filled or neon indicator tubes L1 and L2 are also connected to the anodes of the tubes B1a and B1b, respectively, and thence via a common resistance R3 through the terminal 2' to the positive pole of the battery V. Terminals 1' and 12' of this trigger circuit supply the current for heating the cathodes of the tubes B1a and B1b.

If the control grid of the tube B1a is strongly negative with respect to its cathode, it is non-conductive and carries no current; and via potentiometer R8/R16 a positive potential is applied to the control grid of tube B1b through resistors R8, R1/R2 from the positive terminal 2'. The tube B1b is then conductive which makes its anode voltage lower or less positive than the anode voltage of the tube B1a, so that the indicator lamp or tube L2 glows and indicator lamp or tube L1 is extinguished. The output terminal 9' thus has a higher positive voltage than the output terminal 4', and terminal 6' has a voltage which is intermediate the voltages of the output terminals 9' and 4' because the resistors R12 and R18 are preferably selected to have equal ohmic values. When the potential to the control grid of the tube B1a rises or becomes more positive to a predetermined voltage, this tube B1a will become conductive placing a more negative voltage on the grid of the tube B1b through resistor R8, and as a result of which the tube B1b will then become non-conductive. The indicator lamp L1 then begins to glow and lamp L2 is then extinguished. The output terminals 9' and 4' then also interchange their voltages. The circuit is so connected that the transition from one condition to the other takes place substantially instantaneously or with a jump, or triggers, which action occurs within a small voltage range of say about 1 volt or ±half a volt of the predetermined control voltage at the input terminal 7' or 8'. In either condition of the circuit, however, the terminal 6' has substantially the same voltage because the resistors R12 and R18 are equal. Thus, if the input terminal 7' bears a voltage that is nearly equal to the voltage of the terminal 6', i.e. slightly below or slightly above (i.e. more negative or more positive than) that on terminal 6', the condition of the circuit changes.

Figure 3:
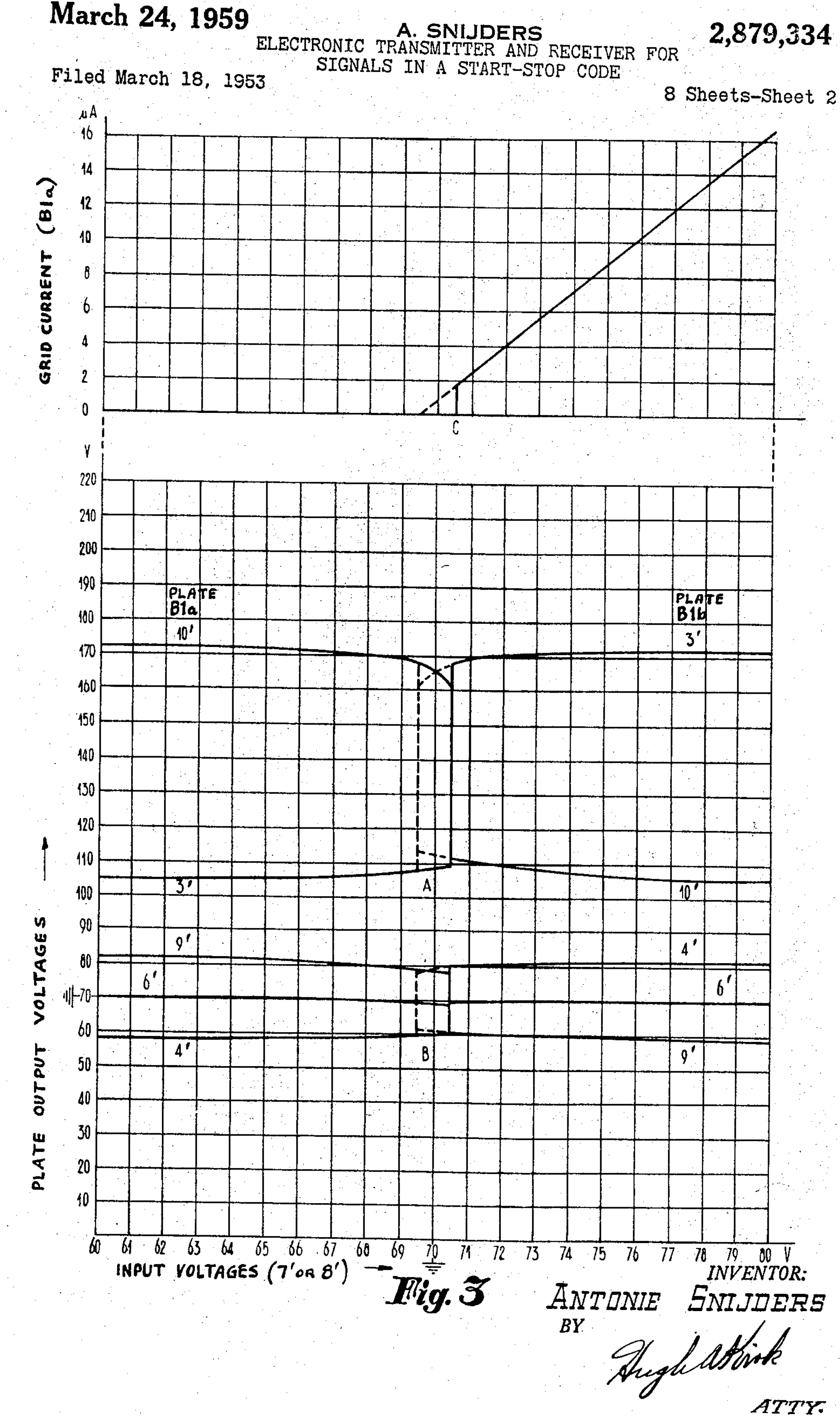
Fig. 3 represents graphs of the grid current and plate output voltages for various input voltages at different terminals of the standard trigger circuit shown in Fig. 2.

This operation may be more clearly illustrated by a specific example, the results of which are shown on the graphs in Fig. 3. In this example the values of the resistances or resistors have been considered to be as follows: R1=R2=R4=R5=R6=R9=R11=R12=R18=R19=39 kilo ohms (kΩ), R7=R8=R13=R14=R16=1 megohm (MΩ); R3=820 kΩ, R10=470 kΩ, R15=50 kΩ, and R17=270 kΩ. The battery V has been chosen to have a voltage of 220 volts between its positive and negative poles.

With tube B1a non-conductive the output terminals 9' and 4' bear voltages of 80 volts and 60 volts, respectively, and the input voltage at terminal 7' or 8' will be lower than 70 volts; while terminal 6' has a voltage of 70 volts (see Fig. 3). If the input voltage (the abscissa) of the graph shown at B in Fig. 3 is increased above 70 volts to about 70.5 volts, the output voltage (the ordinate) at terminal 4' changes from 60 volts to 80 volts and terminal 9' changes from 80 volts to 60 volts. In the case of a further increase of the input voltage at terminal 7' or 8', the voltage occurring at the output terminals 4' and 9' remain practically unchanged as can be seen by the substantially horizontal lines 4' and 9' of the curves in Fig. 3. If the input voltage is decreased, the voltage will revert to the original condition when the input voltage reduces to about 69.5 volts (see the dotted lines at B in Fig. 3).

If the output terminals 9' and 4 are loaded, the voltages occurring at these terminals would change, which also would change the voltage occurring at terminal 6' because it is connected to have a voltage halfway between that at terminals 9' and 4', and since there is a coupling between the control grid of the tube B1b through a resistance R17 and the terminal 6', there would also be a change in the input voltage to tube B1b which could cause the circuit to change its condition. However, since several of these circuits must cooperate in one system according to this invention, the terminals 6' are connected together so that the voltage levels at their terminals 6' remain constant and as equal as possible.

The outputs of the tubes B1a and B1b indicated by curves 10' and 3', respectively, are disclosed in Fig. 3 to have a wider voltage range than those taken from the terminals 9' and 4' because of the resistances of the potentiometers R6/R11 and R9/R19, respectively, through which terminals 9' and 4' are connected. There is also shown for comparison purposes at the top of Fig. 3 a graph of the grid current for the tube B1a with respect to the input voltages at terminal 8' to show when the tube B1a is conductive with respect to the voltages at output terminals 3', 4', 9' and 10'.

The output terminal 5' (see Fig. 2), which is of high ohmic value or nature, may be connected to the input terminal 7' so that the condition of the trigger circuit remains unchanged after the controlling input voltage has been taken away from the terminal 7' or 8'. Such a circuit connection is shown by dotted line conductor 15 and is employed in converting the standard circuit of Fig. 2 to the memory device circuits GSI–GSVII, SSI–SSVII shown in Figs. 8, 8', 10 and 10'.

(3) *Start-stop and generator circuits*

Figures 4, 5:
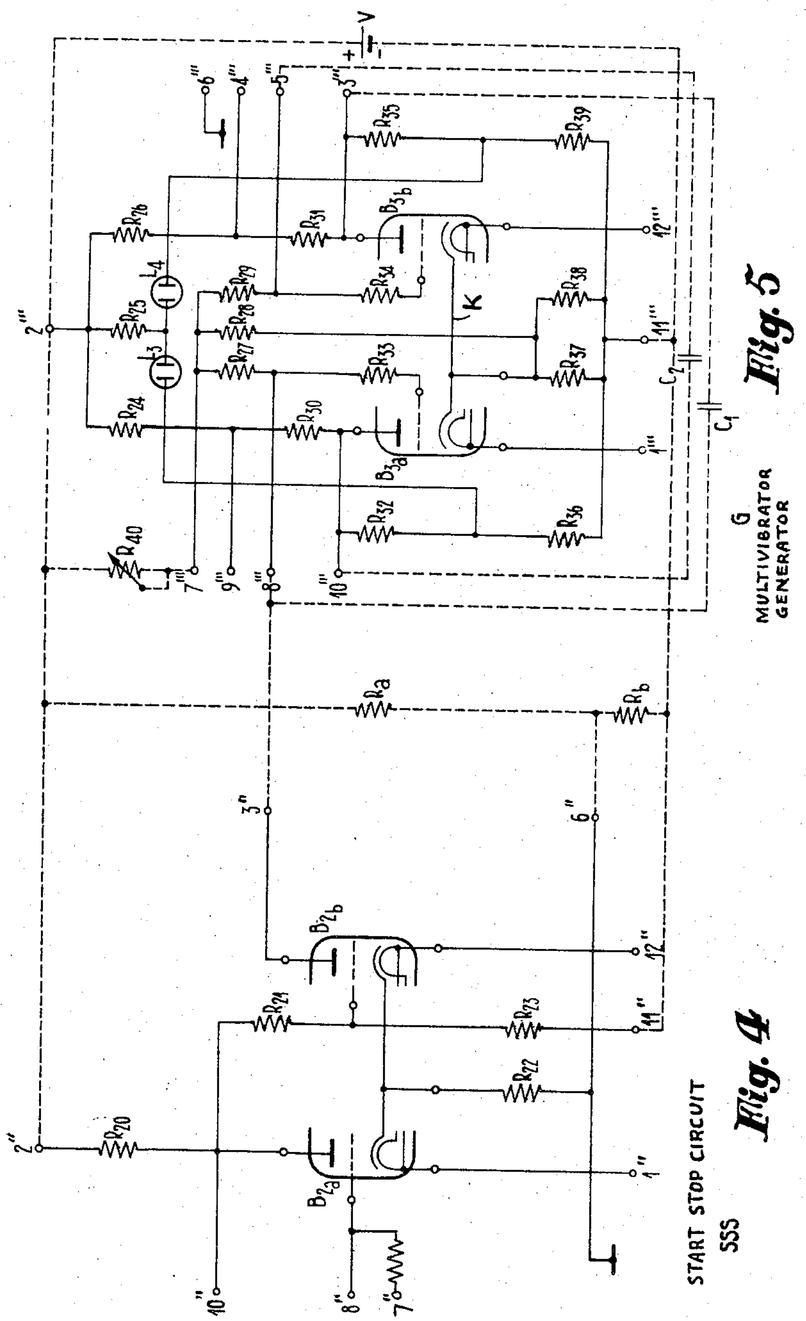
Fig. 4 is a wiring diagram of the start-stop circuit SSS shown in Figs. 8 and 10 together with some of its connections (shown in dotted lines) to the multivibrator generator G of Fig. 5.
Fig. 5 is a wiring diagram of the multivibrator generator circuit G shown in Figs. 8 and 10 together with some of its connections (shown in dotted lines) to the start-stop circuit SSS of Fig. 4.

Detailed circuits of the start-stop circuit SSS and multivibrator or generator G are shown, respectively, in Figs. 4 and 5, with connection to some of their terminals shown in dotted lines in accordance with their normal connection in the circuits of Figs. 8 and 10.

The start-stop circuit shown in Fig. 4 is used for starting and stopping the multivibrator circuit shown in Fig. 5 in response to the start and stop elements of the code signal; the start element pulse being transmitted from an input amplifier circuit IS through an electron relay cell means to the input terminal 7'' of the start-stop circuit SSS, and the stop element pulse being transmitted from either the memory device GSI in receiver or from the amplifier VS in the transmitter.

For the purposes of illustration specific examples are presented of a start-stop circuit SSS and a generator circuit G, each of which circuits may comprise a double triode tube B2a/B2b and B3a/B3b, respectively, and may be composed of resistances or resistors having the following ohmic values: In Fig. 4 resistors R20=R23=1.2 MΩ, R21=820 kΩ, R22=27 kΩ; and in Fig. 5 resistors R24=R26=R30=10 kΩ, and R25=680 kΩ, R27=R29=1 MΩ, R28=R37=56 kΩ, R32=R35=270 kΩ, R33=R34=39 kΩ, R36=R39=560 kΩ, R38=47 kΩ. There is also shown connected by dotted lines to the multivibrator or generator circuit G of Fig. 5, two condensers C1 and C2 each of about $20{,}000\times10^{-12}$ farads or 0.02 μf. (microfarads).

The voltage at the cathode of the double triode B2a/B2b of the start-stop circuit SSS is about 70 volts and the battery V has a voltage of 220 volts. If the control grid of the tube B2a has a voltage which is lower than 70 volts, this tube is non-conductive and carries no current. As a result of this condition the tube B2b is conductive and does carry current. The anode of tube B2b is directly connected to output terminal 3''.

Referring now to the generator G in Fig. 5 the output terminal 3'' is directly connected to the generator input terminal 8''', which is then connected both through a resistance R27 to a positive terminal 7''' and through a resistance R33 to the control grid of the tube B3a of the generator. Thus, the grid of the tube B3a has the same negative potential with respect to its cathode as this grid, if during the working of the multivibrator, the tube B3*a* is non-conductive. The control grid of the tube B3*b* in the generator is connected via resistors R34 and R29 also to the positive potential at the terminal 7‴. Connected at the terminal 7‴, between it and positive battery V, may be a variable resistor R40 by means of which the frequency of the whole multivibrator circuit of Fig. 5 may be adjusted, which in the case for scanning the signal of Fig. 1 is 50 cycles/second. With the grid of tube B3*b* connected to a positive terminal 7‴, this tube is conductive and the indicator lamp L4 associated therewith glows.

The capacitors C1 and C2 connected, respectively, between the anode of tube B3*b* or terminal 3‴ and the grid of the tube B3*a* through terminal 8‴, and the anode of tube B3*a* or terminal 10‴ and the grid of tube B3*b* through terminal 5‴, are charged to equal voltages by the conductivity of this tube B3*b*. If the voltage in the control grid of the tube B2*a* of the start-stop circuit SSS is increased or becomes more positive to about 70 volts, this tube B2*a* will become conductive and the tube B2*b* will be cut-off or become non-conductive. The capacitor C1 then discharges itself via the resistor R27 and the control grid voltage of tube B3*a* rises. After 10 milliseconds, the tube B3*a* of the generator circuit G becomes conductive and its corresponding indicator lamp L3 glows, this being the time for the discharge of the condenser C1. Then the voltage drop occurring at the anode of the tube B3*a* is transferred by means of the capacitor C2 to the control grid of the tube B3*b* through resistor R34, as a result of which this tube B3*b* now becomes non-conductive. The capacitor C1 is now quickly recharged to the original high value via the anode resistances R26 and R31. In consequence of the discharge of capacitor C2 via the resistor R29, the control grid of tube B3*b* will attain the potential of its cathode again, so that this tube again becomes conductive and the tube B3*a* again becomes non-conductive, etc. Thus, via the time constant circuits C2/R29 and C1/R27 the tubes B3*a* and B3*b* alternately become conductive every 10 milliseconds to produce the pulses at its output terminal 3‴ forming a square wave.

The continued generation of this output wave is stopped, however, by putting the tube B2*a* in the start-stop circuit SSS of Fig. 4 in its non-conductive state again, by reducing the control grid voltage of this tube below 70 volts at its input terminal 8″ or 7″. This is done by a negative pulse potential, corresponding to the stop element of a signal, applied from memory circuit GSI in the receiver, or from amplifier VS in the transmitter, to cause the grid of tube B2*a* to become more negative and to shut-off the conductivity of tube B2*a* which in turn causes the tube B2*b* to become conductive again and to shut-off the multivibrator generator circuit G in Fig. 5 at the end of its cycle of oscillation corresponding to the end of a complete code signal.

It is to be observed that if the tube B2*a* in the start-stop circuit becomes conductive for a shorter time than 10 milliseconds, the generator tubes B3*a*/B3*b* will not change their conductivity conditions and the generator G will not start oscillating. If desired, this interval may be shortened or lengthened in two ways: (1) by choosing the various elements, such as resistors of the start-stop circuit SSS such that if the tube B2*b* is conductive, the control grid of the tube B3*a* will have a higher or lower potential than the voltage this grid had if tube B3*a* is non-conductive during the working of the multivibrator; or (2) by choosing the values of the condensers C1 and C2 to be unequal (but so that the multivibrator continues to work on a frequency of 50 cycles).

Figure 6:
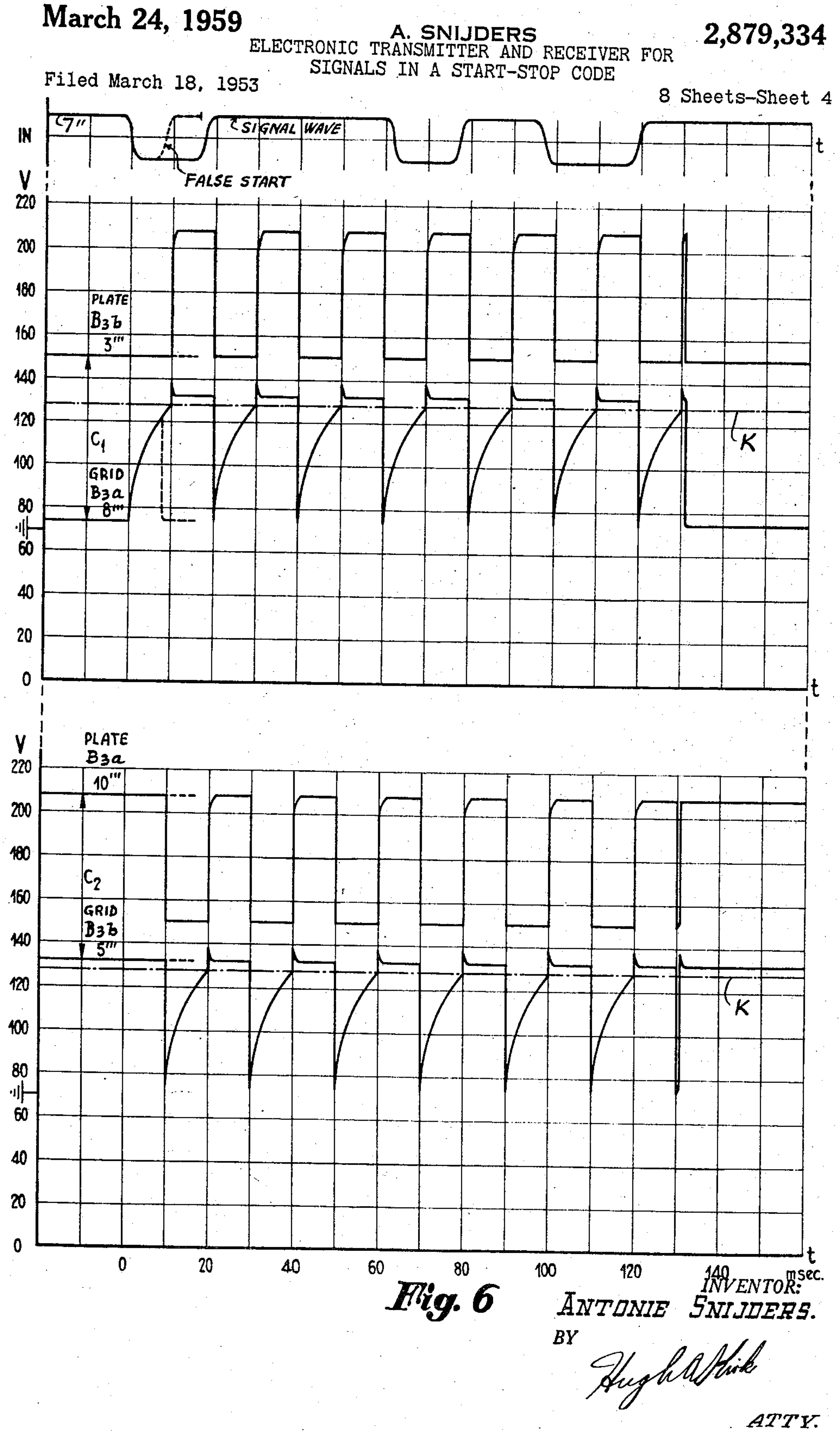
Fig. 6 represents graphs of the voltages with respect to the time for one multi-element signal at various terminals of the multivibrator circuit of Fig. 5.

In Fig. 6 are shown graphs of the potentials at the points of the terminals 3‴, 8‴, 10‴ and 5‴ of the multivibrator circuit of Fig. 5, with respect to the time corresponding to an input code signal wave 7″ of seven elements shown at the top of the graph. It should be noted that the difference between the potentials at the output terminals 3‴ and 8‴ corresponds to the varying charges on condenser C1, and the difference between potentials at the output terminals 10‴ and 5‴ corresponds to the varying charges on condenser C2. The cathode potentials of the two tubes B3*a* and B3*b* of the multivibrator circuit of Fig. 5 are indicated by the dot-dash line K at about 125 volts in each of these graphs. Thus, when the input voltage on terminal 8‴ or 5‴ exceeds the cathode voltage K, the tubes trip over so that the tube B3*a* or B3*b*, respectively, is made conductive and the other tube shuts off.

It should be noted that a false start pulse or a pulse less than 10 milliseconds in duration, an example of which is shown in the dotted lines at the beginning of the signal 7″ at the top of the graph in Fig. 6, is not of sufficient duration to completely discharge the condenser C1 or C2 to reach the cathode potential K, and accordingly any number of such false pulses less than 10 milliseconds in duration will not start the multivibrator circuit G into operation. Thus the multivibrator circuit of Fig. 5 automatically ignores such false start pulses regardless of how often they are repeated.

III. A RECEIVER SYSTEM

Now that the details of the basic circuits employed in this invention have been described, the specific connections and details of a receiver will be described, including the electron relay cell means, which are an important and essential feature of the system of this invention. A wiring diagram for such a receiver is shown in Figs. 8 and 8′ in combination, in which the previously described circuits IS, SSS, G, IV and GSI through GSVII are represented by boxes with their terminals having corresponding numbers to those described in Figs. 2, 4 and 5. First it should be noted that all of the terminals 6′, 6″ and 6‴ of all these box circuits are connected to ground. As a result of this, the input level of each circuit is adjusted to ground potential, and the output voltages at the terminals 9′ and 4′ have values of plus 10 volts or minus 10 volts with respect to ground. This is in accordance with the specific examples mentioned above, wherein a battery of 220 volts is employed with its corresponding poles connected to all of the positive poles 2 having a +150 volts with respect to ground and the negative poles 11 of these circuits having a —70 volts with respect to ground.

The circuits IS, VS and GSI through GSVII are standard bi-stable trigger circuits according to those described in Fig. 2; the start-stop circuit SSS is according to Fig. 4; and the multivibrator generator circuit G is according to Fig. 5.

(1) *Rest condition and first locking circuit*

Before describing the operation of the receiver system of Figs. 8 and 8′, its rest condition will be described which is its energized or "on" condition before the start element of an arriving multi-element code signal, such as for example that shown in Fig. 1, is applied to the input terminal IN connected directly to terminal 7′ of the input amplifier shaper IS. In this rest condition this terminal 7′ normally has a positive voltage or charge with respect to ground due to the positive voltage applied to the input terminal IN (see Fig. 1 at the left of "Start" pulse). Resistance R41 is connected between the grid of electron tube B1*a* in the circuit IS and ground. With this positive potential on the input terminal 7′, the electron tube B1*a* in circuit IS is conductive and the electron tube B1*b* is non-conductive, so that this circuit is considered to be in its positive state and a positive potential is applied to its output terminal 4′ while a more negative potential, or negative with respect to ground, is applied to its output terminal 9′. This terminal 9′ is connected through a rectifier G1 to a junction *a* of an electronic relay cell means, which junction *a* is also connected through a low impedance R70 to a positive potential and through other rectifiers G3 and G4, respectively, to a junction *g* connected through conductor 20 to the output 9′ of the first memory device or circuit GSI and to a junction *b* of another form of relay cell connected to the input of the start-stop circuit SSS. The junction *b* is connected through another rectifier G5 and conductor 21 to another and opposing output 4′ of the first memory circuit GSI. The junction *a* assumes the more negative potential from the terminals 9′ of circuit IS and the memory circuit GSI, and junction *b* assumes the more positive potential of the potentials from the junction *a* and output terminal 4′ of memory circuit GSI. Since output terminal 9′ of the input amplifier circuit IS in this rest condition is negative, then junction *a* is also negative regardless of the potential of the output of terminal 9′ of the memory circuit GSI and junction *g*.

The rest condition for the first memory circuit GSI is in its negative state because a negative potential is applied to its input terminal 7′ either from the start element of the preceding signal, or from a negative state originated in another manner in one of the preceding memory circuits and taken over by the memory device GSI from it, or because of the negative potential applied to the input terminal 7′ from a locking circuit when the system is energized and all the memory devices GSII through GSVII are in their positive state. This locking circuit which permits negative potential to pass a relay cell having a negative potential source through a low impedance R80, a junction *j* and rectifier G11, when input shaper IS and all the other memory devices GSII through GSVII are in their positive state as when the system is switched-in and negative potentials are applied to all of their output terminals 9′ connected through rectifiers G2, G18, G26, G34, G42, G50 and G58 to the junction *j*. This locking circuit prevents the memory circuits from shifting or cyclicly rotating, when the circuit is turned on and thereby maintains memory circuit GSI in its negative state to establish the rest condition. Thus the electron tube B1*b* of the first memory circuit GSI is conductive and a negative potential is applied to its output terminal 4′ and thence through conductor 21 to rectifier G5 connected to the junction *b*.

Since both of the connections to rectifiers G4 and G5 to junction *b* are now negative, junction *b* cannot assume a positive potential at all, and consequently the input terminal 7″ of the start-stop circuit SSS is also negative and its tube B2*a* is non-conductive keeping generator G inoperative (see section II–3).

The input terminal 7′ of the impulse amplifier IV is connected through relay cell means by way of junction *n*, rectifier G6 and a junction *k* to a tap of negative voltage on a potentiometer and via a condenser C3 to the output of the generator G, and rectifier G7 through conductor 22 and resistance R47 to the now negative output terminal 4′ of the first memory circuit GSI, so that said input terminal 7′ of the impulse amplifier circuit IV is also negative and this amplifier circuit IV is in its negative state.

This rest condition of the receiver system of Figs. 8 and 8′ is also illustrated in the chart of Fig. 7 to the left of the vertical dot-dash line PQ, wherein each of the memory devices GSI through GSVII are shown remaining in the condition they were given by the polarities of the elements of the last previously received signal, namely: the first memory circuit GSI (at the bottom of the chart) corresponds to the negative start element of each signal and is in its negative state, the five intermediate memory circuits GSII through GSVI correspond to the elements of signal intelligence elements 1 through 5 being either positive or negative according to said preceding signal and are represented in circles, and the last memory circuit GSVII corresponds to the positive stop element of the signal and is in its positive state.

Thus, before a signal of the type shown in Fig. 1 is received and after the receiver system of Figs. 8 and 8′ is turned on, the bi-stable trigger type circuits IV and GSI are in their negative state, circuits IS and GSVII are in their positive state, the intelligence elements memory circuits GSII through GSVI may be either all in their positive state or in either state, the start-stop circuit SSS is in its negative state, and generator circuit G is not operating.

(2) *Starting and pre-conditioning circuits*

In order to start the receiver system of Figs. 8 and 8′ from its turned-on and in rest condition just described, a negative start element of at least 10 milliseconds' duration must be applied to the input terminal IN. Assuming such a start element pulse has been applied to this terminal IN, the following changes in the states of the above mentioned circuits take place:

Input amplifier shaper circuit IS changes its state from positive to negative applying a positive potential from its output 9′ to rectifier G1 to the junction *a*. Since the first memory circuit GSI is in its negative state and therefore applies a positive potential from its output terminal 9′ through resistance R46, junction *g*, conductor 20 to rectifier G3, the positive potential applied to junction *a* through the low impedance R70 is conducted through rectifier G4 to the junction *b* which positive potential is then directly applied to the input terminal 7″ of the start-stop circuit SSS, since the negative potential from the output terminal 4′ of the first memory circuit GSI through conductor 21 is blocked from the junction *b* by the rectifier G5.

The start-stop circuit SSS is now energized and put into its positive state whereby according to section II–3 above, the multivibrator generator circuit G is started into operation provided the duration of the start potential on the terminal 7″ is for more than 10 milliseconds to overcome the delay in the circuits of the multivibrator by the condenser C1 or C2.

As soon as the multivibrator generator G starts to oscillate, its first positive impulse, which is applied to its output terminal 3‴, is passed through the condenser C3 to the junction *k* where it is blocked by rectifiers G6 and G8 connected by conductor 23 and thereby kept from the input terminal of the impulse amplifier IV, but the low impedance R71 on the other side of rectifier G8 is now permitted to be applied to the input terminal 7′ of the first memory circuit GSI through conductor 24 and rectifier G10. This first positive impulse from the generator G at the junction *k* does not affect the junction at the input terminal to the impulse amplifier IV by permitting the positive potential through low impedance R72 to start it operating or change its state, because a negative potential is still applied to this terminal 7′ of circuit IV due to the delay of the time constant circuit of condenser C7 and resistance R47 connected to the negative potential which has up to this time been applied to the output terminal 4′ of the first memory circuit GSI and is maintained until the change over of the condition of this first memory circuit is able to take place by the just applied positive impulse from the low impedance R71, because the input terminal 7′ of circuit IV is connected to respond to the more negative potential applied to it.

The change of state of the first memory circuit GSI from negative to positive by the first positive impulse from the generator G applies a positive potential to its output terminal 4′ to discharge the condenser C7 and prepare the impulse amplifier circuit IV for the next positive pulse from the generator G. Positive potential is now also applied from the same output terminal 4′ through conductor 21 and rectifier G5 to maintain the junction *b* positive until the first memory circuit GSI is made negative, which according to the chart of Fig. 7 will not occur until the whole signal has been received and the negative start element has been applied to the first memory circuit GSI by being stepped or shifted to it from the last memory circuit GSVII (which will be made negative or put in its negative state by further operation of this first memory circuit described below). Thus, the start-stop circuit SSS and the generator circuit G will remain in operation until this positive potential is removed from junction *b*.

This positive state for the first memory circuit GSI applies a negative potential from its output terminal 9' to the point *g* which has the effect of blocking positive potential from passing the electron relay cell connected to the impedance R71 and conductor 24 to the input terminal 7' of the first memory circuit GSI so that further incoming signal element pulses either positive or negative will not affect the present positive state of this first memory circuit GSI. Also this negative potential at the point *g* is conducted through conductor 20 and rectifier G3 to junction *a* to keep it negative and closed to any pulses of either polarity which may be applied to it from the output 9' of the input amplifier IS from the different elements of the signal. Thus, once the first memory circuit of device GSI has been energized by the first positive impulse from the generator G after a proper start element of a signal has been received, said first memory circuit GSI remains in its positive state because in the shifting process it only receives positive pulses from GSII through GSVI which were all positive until the start element of that signal has been shifted through them to this circuit GSI. This first memory circuit GSI takes the place of the distributor circuit described in Snijders prior application Serial No. 322,180, filed November 24, 1952, now Patent No. 2,842,616, by remaining in its positive state for 120 milliseconds.

With the first memory circuit GSI now in its positive state for the duration of the signal cycle, a negative impulse is applied at the moment of its change to its positive state from its output terminal 10' to which is connected a condenser C4 which is then connected to a junction of a potentiometer made up of the resistances R42 and R43 connected between a positive potential and ground. From this junction through conductor 25 a negative impulse is applied through rectifier G60 (see Fig. 8') to the input terminal 7' of the last memory circuit GSVII, which here in the receiver system is the end of the series of memory devices or circuits to which all of the elements of the received signal are first applied and where they are successively stored before being shifted through the series toward the first memory circuit GSI. This negative impulse on input terminal 7' of circuit GSVII changes it to its negative state thereby applying a negative potential with respect to ground to its output terminal 4' and a positive potential to its output terminal 9'.

Further when the first memory circuit GSI changes to its positive state, a positive impulse is applied from its output terminal 3' to which is connected a condenser C5 which is connected to a junction of a potentiometer of resistances R44 and R45 between a negative potential and ground. This junction is connected through the common conductor 26 to rectifiers G19, G27, G35, G43 and G51 to the respective input terminals 7' of each of the memory devices or circuits GSII through GSVI, respectively, corresponding to the intelligence elements 1 through 5 of the signal. This positive impulse thus pre-conditions or changes each of these intelligence element memory circuits into their positive states (see Fig. 7 vertical column "Start").

Accordingly, the start element of each signal when it is received, pre-conditions all of the memory device circuits GSI through GSVII by putting them all in their positive states, except the last memory device circuit GSVII which is put in its negative state corresponding to the start element of the signal. Each of the elements of the signal as they are received are then applied to the last memory circuit GSVII, as will be described in the next section, so that the start or negative polarity, condition or state now applied to the last memory device GSVII will be successively stepped or shifted one step or memory circuit at a time toward the first memory circuit GSI each time the next element of the signal is received and scanned (see Fig. 7).

(3) *Scanning, shifting and storing circuits*

30 milliseconds after the start of a good start element pulse and 20 milliseconds after the first positive impulse from the generator circuit G, the second positive impulse from the generator is produced for operating the impulse amplifier circuit IV which in turn synchronizes the scanning and shifting operations of the system. Negative impulses from generator G have no effect on the amplifier circuit IV because of the relay cell with junction *k* is already negative. As stated above the multivibrator generator circuit G will continue to operate or oscillate producing positive impulses each 20 millseconds until it is stopped by the removal of the positive potential from the junction *b* from the output of the first memory circuit or device GSI through conductor 21 when the negative start element polarity has been stepped through the series of memory devices from the last device GSVII to the first device GSI.

The second positive impulse from the generator G which is now applied from the junction *k* to rectifier G6 is now balanced by a positive potential applied to the rectifier G7 through conductor 22 from the output of the first memory circuit GSI, so that the positive potential applied through the low impedance R72 which is connected to the input terminal 7' of the impulse amplifier IV will cause this amplifier IV to change its state from negative to positive, and thereby produce two opposite polarity impulses simultaneously, namely, a positive impulse from its output terminal 4' connected to conductor 27 and a negative impulse from its output terminal 9' connected to conductor 28.

The positive impulse is simultaneously applied from conductor 27 to rectifiers G16, G24, G32, G40, G48, G56 and G66 of one of the relay cell means corresponding to each of the memory circuits GSI through GSVII, respectively, which control the scanning and shifting functions of the system and comprise part of the gating and scanning devices. For example, the corresponding relay cell for the gating device corresponding to the second memory device GSII for the first intelligence element 1 of the signal, is indicated in Fig. 8 to have a junction *c*, which junction takes the more negative potential that is applied to it from any of the three rectifiers G20, G22 or G24 connected to it. One of these other rectifiers, namely rectifier G22 of this relay cell, is connected to the point *e* which is directly connected through conductor 29 to a delay circuit comprising condenser C9 and resistance R49 which is connected to the output terminal 4' of the third memory device circuit GSIII, which now has already been pre-set or pre-conditioned to be in its positive state and accordingly applies a positive potential to the point *e* until about one millisecond after the positive and negative scanning and shifting impulses are applied to the memory devices (whereby the state of the memory circuit GSIII is changed), so that proper shifting can occur. Now since positive potentials are applied everywhere to the junction *c* then a positive potential is similarly applied therefrom through the third rectifier G20 to the point *f* connected to the input terminal 7' of the memory device GSII, and it accordingly remains in its positive state (see chart of Fig. 7, vertical column 1).

The negative impulse from the impulse amplifier circuit IV which is produced simultaneously with its positive impulse, is applied via conductor 28 to rectifiers G17, G25, G33, G41, G49, G57 and G67 of the other of the pair of relay cell means of each gating and scanning device coresponding to each of the memory device circuits GSI through GSVII, respectively. This second relay cell of the gating device for the second memory circuit GSII is indicated in Fig. 8 to have a junction *d*, which junction takes the more positive of the potentials applied to it from any of its three rectifiers G21, G23 or G25 connected to it. Since rectifier G23 is connected to the positive potential at point *e*, this potential is transmitted to the junction *d* but blocked by the rectifier G21 from the point *f*, so that this point remains positive as described above for the operation of the relay cell having the junction *c*. Similar pairs of relay cells and connections are employed for each of the other memory device circuits GSI and GSIII through GSVII, so that a detailed operation of the scanning and shifting operations is only described in connection with this second memory circuit GSII and its pair of relay cell means having junctions *c* and *d* in its corresponding gating device.

Since all of the memory devices are connected in series in the same way as that just described for the memory device GSII, and since all of these memory devices are pre-conditioned to be in their positive states, there is no change in any of these memory devices by the second positive impulse from the generator G and the first positive pulse from the impulse amplifier IV, except for the last intelligence element memory device GSVI and also possibly the last memory device GSVII which now respectively take over the states corresponding to the last memory device and the next or first intelligence incoming signal element (see Fig. 7).

Thus, the last memory device GSVII which has been in its negative state because of its pre-setting by the first impulse from the generator G, has its negative state and potential applied through conductor 30 (see Fig. 8') from its output terminal 4' to the junction *e'* of the preceding scanning device corresponding to memory device GSVI, which permits (when the negative impulse from amplifier IV is applied to rectifier G57) a negative potential to be applied through junction *d'* and rectifier G53 to the point *f'* connected to the input terminal 7' of the memory circuit GSVI to change its state from its preset positive condition over to its negative state before the negative charge from the delay circuit of condenser C13 and resistance R53 may be dissipated by the charge of the next signal element. Simultaneously with this shifting, the positive impulse from amplifier IV applied to the rectifier G56 of the same gating device has been blocked by this delayed negative potential applied to the point *e'*. Thus, the delay circuits between each of the memory devices permit the charge of a later one to be transferred or shifted to a former one each time an impulse is applied to the series of memory circuits before any change in the charge or state of the latter one can effect the former one.

Since the last memory device GSVII is not connected cyclicly to the first memory device but instead through a conductor 31 directly to the output terminal 4' of the input amplifier shaper circuit IS, the last memory device GSVII will take the charge of the corresponding element of the signal which occurs at the scanning input point *e''* at the time the impulses from the impulse amplifier IV are produced. Thus, assuming that the first intelligence element of the signal is of a positive potential as shown in Fig. 1, then the input amplifier IS is changed again into its positive state and a positive potential is applied through the conductor 31 directly to the point *e''* (Fig. 8'), between the pair of relay cells of the gating device corresponding to the last memory device circuit GSVII. With the point *e''* positive, a positive potential is conducted to the junction *d''* of the gating device which potential is blocked from the input of the memory circuit GSVII by the rectifier G62 as is the negative impulse by the rectifier G67 from the impulse amplifier IV. However, the positive impulse simultaneously applied to the rectifier G66 of this gating device connected to the junction *c''*, together with the positive potential now at the point *e''*, permits the positive potential normally applied through the low impedance R54 to the junction *c''* to the conducted through the rectifier G61 and applied to the input terminal 7' of the last memory device circuit GSVII to change its state back to the positive corresponding to the first intelligence signal element 1. This change, however, does not affect the shifting of its previous state to the preceding memory circuit GSVI, since its previous state potential is retained by the delay circuit of condenser C13 as above described.

If on the other hand, the first intelligence element 1 of the signal were negative instead of positive as shown in Fig. 1, then the point *e''* would be given a negative potential, which would then be applied to the junction *c''* and make it negative and block its negative charge from the input 7' of the circuit GSVII, and simultaneously permit the negative potential through low impedance R55 to be applied to said input terminal 7', thereby maintaining the last memory circuit in its negative state for the duration of another signal element, namely, 20 milliseconds more.

The shifting of each of the memory devices simultaneously as the positive and negative impulses are produced from the impulse amplifier circuit IV at the centers of each of the timed incoming signal elements, thus changes the states of each of the memory devices GSI through GSVII as shown in the chart of Fig. 7 in accordance with the charges and circuits described above. Thus memory circuit GSI takes over the state of memory circuit GSII, circuit GSII takes over the state of circuit GSIII, circuit GSIII takes over the state of circuit GSIV, circuit GSIV takes over the state of circuit GSV, circuit GSV takes over the state of circuit GSVI, and circuit GSVI takes over the state of circuit GSVII, each time impulses are applied to them from the impulse amplifier circuit IV. This is the shifting operation through the series of memory devices GSI through GSVII, which occurs simultaneously, through the delayed charges applied to condensers C7 through C13 with the scanning of the intelligence of each incoming signal element to be received and applied to the end or last memory circuit GSVII.

Since the output terminal VII directly connected to the output 4' of the end and last memory circuit device GSVII successively takes the potentials corresponding to the polarities of the elements of each signal as it is received, this output terminal VII may be used simultaneously with the receiver as a regenerative repeater and the remaining memory circuits or devices GSI through GSVII are then employed for counting the elements of the signal and automatically stopping the system after each signal cycle.

(4) *Stopping and second locking circuit*

120 milliseconds after the first positive impulse from the generator circuit G was produced, the last positive impulse according to the number of elements in the signal herein described is applied to the impulse amplifier IV, and the resulting last simultaneous positive and negative impulses from which amplifier circuit IV are then applied to the memory devices through the conductors 27 and 28, respectively, which cause the shifting of the negative state of the start element pulse from the second memory circuit GSII to the first memory circuit GSI, changing its state for the first time since the reception of the start element of the signal (see Fig. 7).

When the first memory circuit GSI takes over the negative state of the start element, its output terminals also change the potentials applied to them so that its terminal 4' now is negative with respect to ground, and its terminal 9' is positive with respect to ground. The negative potential now on the terminal 4' of the first memory circuit GSI applies a negative potential through conductor 21 to the rectifier G5 connected to the junction *b*. The positive potential now applied to the output terminal 9' of this first memory circuit GSI does not immediately apply a positive potential to the point *g* because of the delay circuit comprising condenser C6 which may be variably adjustable and resistance R46, so that negative potential is still applied from this point *g* and condenser C6 through conductor 20 to rectifier G3 of junction *a* so that regardless of the potential or polarity of the input signal element at terminal IN at this instant, the junction *a* will be negative from rectifier G3 for a sufficient time governed by variable condenser C6 after each signal cycle to insure the automatic stopping of the system by removing the only other positive potential from the junction *b* connected to the input terminal 7″ of the start-stop circuit SSS, thereby insuring the stopping of the generator G and of the whole receiver system at the end of each signal received. As long as the point *g* remains negative due to the adjusted value of the condenser C6, no signal potentials applied to the input terminal IN can be received and detected to control the system or to start the generator G. Thus, the duration of the stop element at the end of each signal cycle may be varied and be definitely determined by the value of this delay circuit or of variably adjustable condenser C6, so that no start elements of a succeeding signal can be received within say at least 5 milliseconds after the last scanning impulses are applied to the memory devices, which means that each signal received will then have a duration of at least 135 milliseconds before a succeeding signal can be received.

The positive potential now at the output terminal 9′ of the first memory device GSI is prevented from affecting the input terminal 7′ of this device by the blocking rectifier G9, but it is immediately conducted through conductors 32, 33 and 34 to further relay cell means associated with the output terminals II through VI of each of the intelligence memory devices GSII through GSVI, respectively, now permitting the intelligence stored in these devices corresponding to the received signal to be passed on or detected from them for operation of a telegraph code recorder, tape printer, teletypewriter, or the like. Each of these further relay cells comprises a pair of rectifiers, as rectifiers G87 and G88 for the second memory device GSII for the first intelligence element 1. This detection must be accomplished before the start element of the next following signal is received and starts the receiver circuit again, because such then re-conditions all of these memory devices into their positive state as described above in section III–2.

Although the positive potential on the junction of the potentiometer R42—R43 which is transmitted through the conductor 25 to the rectifier G60 is blocked from changing the state of the last memory device into its positive or rest condition or state which corresponds to the stop element of each signal, this last memory device is insured of being placed in its positive state or rest condition through either or both of two other positive potential sources, one from the positive potential of the stop element of the signal received, and the other from a second locking circuit (see Fig. 7 Stop column). Assuming that the stop element of the received signal is properly received and scanned by the last pair of simultaneous impulses from the amplifier circuit IV, then its corresponding positive potential from the output terminal 4′ of the input circuit IS conducted through conductor 31 to the point *e″* of the gating circuit of the last memory device GSVII, is applied through junction *c″* to the input terminal 7′ of this last memory device GSVII just as any other positive signal element is stored thereon.

However, if the stop element of the signal is distorted beyond detection or the last signal element received has a negative polarity as will be the case at the end of a clearing signal, then after such a last signal element of negative polarity has been received and the system is in its rest condition, the last memory device must be placed in its positive state, particularly for regenerative repeater operation. For this condition, a second locking circuit is provided comprising a delay circuit having a variable condenser C14 and a resistance R56, (see Fig. 8′) and an electron relay cell comprising four rectifiers G59, G65, G68 and G69 joined to a common junction *h* to which is also connected a positive potential source through a low impedance R73. After the last signal element has ceased or been cut-off, and the memory circuit GSVII is not in its rest condition or positive state, the normal positive potential applied to the input terminal IN, via resistance R41 insures that the input circuit IS is placed in its positive state or rest condition. This then applies a positive potential from its output terminal 4′ of the circuit IS through conductor 31 to the input point *e″* of the last gating device for memory device GSVII, and since the generator G is shut-off in the rest condition for the system so that no triggering or scanning impulses are applied to this gating device, this positive potential is applied directly to the rectifier G65 and not more than after a slight delay, say of about 10 milliseconds due to the delay circuit of the variable condenser C14 and resistance R56, a positive potential also is applied to the rectifier G69. When the system is in its rest condition, the first memory device must also be in its negative state or rest condition because of its storage of the negative start element of the signal just received which cuts off the generator G, then the first memory device GSI supplies a positive potential from its output terminal 9′ through conductors 32 and 35 to the rectifier G68. Thus, all three of the input rectifiers G65, G68 and G69 of the relay cell of the second locking device are now connected to positive potentials, so that the positive potential supplied to the junction *h* through the low impedance R73 is conducted through its output rectifier G59 to the input terminal 7′ of the last memory device GSVII, to insure that the last memory device GSVII is placed or set in its positive state or rest condition (see Fig. 7), provided, of course, a positive polarity is being received at the input terminal IN.

This, in order to insure under all circumstances the correct operation of the receiver system and its response only to good signal elements, the two locking circuits are provided comprising separate relay cells, (1) one having the junction *h* which prevents the last memory device GSVII from assuming the negative state if the input terminal IN is positive and the system is in the rest condition, and (2) the other having the junction *j* which prevents all the memory devices including the first memory devices GSI from assuming the positive state as a result of accidental circumstances such as when the circuit is turned on or switched in before any signals are received through it (see section III–1).

IV. A TRANSMITTER SYSTEM

Now that a receiver system has been described in detail, a corresponding transmitter system will be described with reference to Figs. 9, 10 and 10′. The basic or standard circuits employed in such a transmitter system are the same as those employed in the receiver system just described, and their operation is the same as that described in chapter II above. The major differences between the transmitter system and the receiver system are that in the transmitter system a separate start signal element apart from the start element of the signal to be transmitted is required to start the system, an additional or auxiliary start-stop circuit is employed, and the output of the system is from the first memory device only, although the shifting of the elements of the signals are made in the same direction through the series of memory devices, that is, from the last memory device toward the first memory device.

(1) *Rest condition and locking circuit*

Before describing the operation of transmitting a given signal from the system shown in Figs. 10 and 10′, the condition or state of its many bi-stable circuits will first be described when the system is energized or turned on before a signal to be transmitted is even applied to the system.

When the transmitter system circuit of Figs. 10 and 10′ is first turned on if any one of the six memory circuits SSII through SSVII is in its positive state, a positive potential is applied through an electron relay cell having a junction conductor 40 connected via rectifiers G87 through G92, respectively. This positive potential from any one of said output terminal 4′ of these circuits SSII–SSVII would cause the conductor 40 to put the auxiliary start-stop circuit VS into its positive state, to start the generator G to oscillate until all of said six memory devices are changed into their negative states or rest conditions. This is accomplished by the multivibrator generator G furnishing regular positive impulses each 20 milliseconds to rectifier G70 which together with the positive potential from the output terminal 4′ of the auxiliary circuit VS through rectifier G74 onto the junction *l* of another electronic relay cell connected to the input terminal 7′ of the impulse amplifier circuit IV causes this amplifier circuit IV to produce simultaneous positive and negative impulses for scanning and controlling the shifting of a continued negative potential through and onto all the memory devices from memory device SSVII to device SSII. This continued negative potential now occurs at the output terminal 9′ of the auxiliary start-stop circuit VS, which negative potential through another electronic relay cell means having a junction *k′* and connected by a conductor 42 to the input terminal 7′ of said last memory circuit or device SSVII is blocked by the rectifier G75, so that each time a negative scanning impulse from the negative output terminal 9′ of the impulse amplifier IV is applied through conductor 43 to the rectifier G76 connected also to the input terminal 7′ of the last memory device SSVII, this device SSVII is put in or maintained in its negative state until the negative potential is removed from the junction *k′* and conductor 42. This stepping and transferring of the last six memory devices to their negative states, continues as long as the auxiliary start-stop circuit VS remains energized or in its positive state, which is until all six of said latter memory devices SSII through SSVII have been changed into their negative states, since at that time the negative potential from each of these six memory device outputs 4′ puts only negative potential on the input of the auxiliary start-stop circuit VS via the rectifiers of the relay cell having the common conductor 40 mentioned above, so that the circuit VS then is shut off and in turn shuts off the generator G.

Thus, the system may make a cycle of operation when it is turned on before it reaches its rest condition, which corresponds to the "Stop" condition at the end of each signal, which in this example has a positive or stop potential on the output terminal 4′ of the first memory device SSI and negative potentials on the output terminals 4′ of each of the other six memory devices SSII through SSVII (see Fig. 9 first (Rest) and last (Stop) columns).

The input circuit IS to which the special and separate start signal element S is connected via input terminal S′, also in rest condition is in its positive state, since a positive potential is applied to terminal S′, see the first wave form S at the top of Fig. 9. This positive state of the input circuit IS applies a negative potential from its output terminal 9′ and thereby maintains the junction *a* of the first relay cell negative, which prevents the junction *b* of a second relay cell connected to the input terminal 7″ of the start-stop circuit SSS from becoming positive and starting said start-stop circuit SSS and thereafter the generator circuit G.

The first memory device SSI is prevented from becoming negative during the rest condition of the system, by means of a locking circuit comprising an electron relay cell having a junction *m* connected to a positive potential source through a low impedance R90 and to rectifiers G73, G93 and G94 connected via conductor 44 between the outputs 9′ and 4′ of the auxiliary start-stop circuit VS and the input circuit IS, respectively, to the input terminal 7′ of the first memory device SSI. Thus, when both of these said output terminals 4′ and 9′ are positive, which occurs in the rest condition just described, then a positive potential from the positive potential source through impedance R90, junction *m* and the rectifier G94, is applied to the input terminal 7′ of the first memory device SSI to insure it being in its positive state, which occurs during both stop and rest conditions of the system.

(2) *Starting and storing circuits*

As soon as the transmitter has been turned on or energized and the basic circuits thereof have reached their rest conditions, the system is then ready to be conditioned for the signal to be transmitted by storing the polarity of its intelligence elements on the intelligence memory devices SSII through SSVII instigated by a separate start signal S which is applied to the input terminal S′. This separate start signal S may be mechanically controlled by a teletypewriter, tape reader, or the like, after it has applied the corresponding polarities or potentials of the intelligence elements 1–5 of the telegraph signal to be transmitted to the input terminal II′ through VI′ shown along the lower edge of Figs. 10 and 10′ below their corresponding intelligence memory devices SSII through SSVI, respectively.

This separate start signal S herein comprises a negative potential pulse having a duration of at least 10 milliseconds in the normal positive potential of rest applied to the input terminal S′ (see top of Fig. 9), corresponding to the regular start elements of the signals communicated by the system of this invention. This negative start pulse of signal S starts the operation of the system of Figs. 10 and 10′ similarly to the starting of the receiver system of Figs. 8 and 8′ by the start element of a received signal, namely by starting the start-stop circuit SSS and the multivibrator generator G. The application of such a negative start pulse to the input terminal S′ of the input circuit IS in Fig. 10 changes this circuit IS from its rest or positive position into its negative state to produce a corresponding positive potential with respect to ground from its output terminal 9′, and a negative potential from its output terminal 4′.

The positive potential from the output terminal 9′ of input circuit IS causes the first relay cell junction *a* to become positive because the other potential applied to it via rectifier G3 is also positive when the auxiliary start-stop circuit VS is in its rest or negative state. This positive potential now at the junction *a* is conducted through rectifier G4 to the junction *b* of the next relay cell which is directly connected to the input terminal 7″ of the start-stop circuit SSS, because the negative potential from the output terminal 4′ of the auxiliary start-stop circuit VS now is blocked from the junction *b* by the rectifier G5; the junction *b* taking the more positive of the two potentials applied to it. Accordingly, with the start-stop circuit SSS now in its positive state, the multivibrator generator circuit G is started provided the start potential applied to it has a duration of more than 10 milliseconds (see section II–3). The generator G then produces alternate positive and negative impulses each 10 milliseconds. The negative impulses generated by the generator G have no effect on this system (same as in the case of the receiver system described in chapter III above), because of the normal negative potential already applied to the junctions *k′* and *l* from a negative potentiometer and rectifiers G71 and G70, respectively.

The first positive impulse from the generator G occurs 10 milliseconds after the start of the separate start signal S, in view of the previously described time constant circuits having the condensers C1 and C2 connected with the generator circuit G. This first positive impulse is conducted through a condenser C3 and applied to the rectifiers G70 and G71 of the separate relay cells having junctions *l* and *k'* respectively. Since the junction *l* is now negative, due to yet remaining rest condition or negative state of the auxiliary start-stop circuit VS via its output terminal 4' and rectifier G74, the impulse amplifier IV having its input terminal 7' connected to this junction *l* is not now started or effected by this first positive impulse from the generator G. However, this first positive impulse from the generator G does affect the junction *k'* to make it positive, since in rest condition the potential of the output terminal 9' of the auxiliary start-stop circuit VS connected to this junction *k'* via rectifier G72, also is positive. This positive potential now on the junction *k'* is conducted via conductor 42 and rectifier G75 to the input terminal 7' of the last memory device SSVII (see Fig. 10'), to change it from its negative state or rest condition into its positive state (see second (Start) column in chart of Fig. 9).

This change of the last memory device SSVII into its positive state causes a negative impulse to be applied from its output terminal 10' which is conducted through condenser C15, conductor 45 and rectifier G100 to the input of the first memory device SSI causing it to change its state from positive to negative (see Fig. 9) and apply the negative start element of the signal to be transmitted from its output terminal 4' which is directly connected to the output terminal Z (see Fig. 10) from the transmitter system. The same change of the last memory device SSVII into its positive state, also and simultaneously applies a positive impulse from its output terminal 3', which positive impulse is conducted via condenser C16 and conductor 46 to the rectifiers G78, G80, G82, G84 and G86 of the separate input electron relays connected to each of the intelligence element input terminals II' through VI', respectively, permitting the intelligence signal element potentials already applied to these input terminals to be conducted to the input terminals 7' of each of their corresponding intelligence memory devices SSII through SSVI and thereby to be placed in states corresponding to the polarities or potentials of said signal elements, i.e. to store the intelligence of said intelligence signal elements to be transmitted in said memory devices until they are shifted and pushed out of the system through the output terminal Z.

The change to the positive state of the last memory device SSVII also applies at least one positive potential from its output terminal 4' through rectifier G92 to the common conductor 40 connected to the input terminal 7' of the auxiliary start-stop circuit VS, to change this circuit VS into its positive or operative position. This change in circuit VS applies a negative potential to its output terminal 9' and a positive potential to its output terminal 4' for the duration of the cycle, or until the last or stop element just applied to the last memory device SSVII is shifted step by step to the first memory device SSI, in view of the rectifier connections to the outputs of the memory circuits SSII through SSVII via the relay cell having its junction the conductor 40. This change of the circuit VS into its positive state also maintains the start-stop circuit SSS operating via conductor 41, and after a slight delay by the time constant circuits of condenser C17 and resistance R57 and condenser C18 and resistance R58, it affects the potentials, respectively, of the junctions *k'* and *l* so that the next positive impulse from the generator G will operate the impulse amplifier circuit IV to produce the scanning and synchronizing impulses for the system.

Thus, the separate start element S not only starts the transmitter system into operation but it also applies the polarities of the intelligence elements of the signal to be transmitted to the intelligence memory devices SSII through SSVI to pre-condition them, as well as to condition the first memory device SSI into its negative state for the start element of the signal to be transmitted, and to condition the last memory device SSVII into its positive state for the stop element of the signal to be transmitted (see second (Start) column of the chart in Fig. 9).

(3) *Scanning and shifting circuits*

20 milliseconds after the first positive impulse from the generator circuit G, the second positive impulse is applied to the rectifiers G70 and G71 of the separate relay cells having junctions *l* and *k'*, respectively (see Fig. 10). Now since the auxiliary start-stop circuit VS has been placed into its positive state or operating condition for the duration of the present signal cycle, the delayed negative potential now applied to the electron relay cell having the junction *k'* via rectifier G72 prevents any further positive impulses from the generator G from affecting the potential of this junction *k'*, so that each time a negative scanning impulse is applied to the last memory device SSVII from conductor 43, a negative potential will be scanned from the conductor 43 via rectifier G76. Accordingly, negative signal elements will be repeatedly applied and shifted through the series of memory devices to push the stored signal to be transmitted off of these devices and place them finally into their rest condition or negative states except the first memory device SSI which will be in its positive state for the transmission of the last and stop element of the signal to be transmitted.

The delayed positive potential applied to the junction *l* via the rectifier G74, by this now positive state of the auxiliary start-stop circuit VS, permits the remaining positive impulses after the first positive impulse from the generator G, to be applied to the input terminal 7' of the impulse amplifier circuit IV to trigger it to produce simultaneously both positive and negative shifting scanning and synchronizing impulses from its output terminals 4' and 9', respectively. The outputs from both of these terminals are simultaneously conducted through conductors 47 and 43, respectively, to corresponding ones of the pairs of electron relay cells of the series of gating devices corresponding to each of the memory devices SSI through SSVI, similar to the operation of the gating devices associated with the receiver system memory devices described in chapter III above. However, only the negative scanning impulses are connected to the last memory device SSVII from conductor 43, in that it is now only to respond to these negative impulses. The state of each memory device corresponds to the potential at its output terminal 4' which in the series of memory devices SSII through SSVII is connected through a slight delay circuit of a condenser and a resistance and conductors 50 through 55, respectively, to the input of the gating device corresponding to the next former memory device, so that the shifting operation can take place without cancelling the charge being simultaneously applied to a given memory device from its adjacent latter device. Thus, as each successive pair of opposite impulses in conductors 43 and 47 from the impulse amplifier circuit IV is produced, the states of the memory devices SSI through SSVII are scanned and shifted one step toward the first memory device SSI, and the rest condition or negative state is successively applied to the memory devices. This shifting operation continues from the second positive impulse from the generator G each 20 milliseconds until the first memory device SSI has been changed into its positive state corresponding to the stop element of the signal being transmitted, which was first applied to the last memory device SSVII; or until all the other latter six memory devices SSII through SSVII have been positioned in their rest condition or negative state, and the intelligence elements of the signal to be transmitted previously stored thereon have been pushed successively off through the output terminal Z of the first memory device SSI. Since the memory devices SSI through SSVII of the transmitter system are primarily employed for shifting purposes, they may be considered also as shifting devices.

4. *Stopping circuits*

As described above in section IV–1, the stop element condition of the system is the same as its rest condition, with all of its memory devices but its first memory device SSI, in their negative state. In the stop condition (see last (Stop) column in chart of Fig. 9) only negative potentials are applied to the electron relay cell connected via rectifiers G87—G92 and conductor 40 from the now negative output terminals 4' of the six latter memory devices SSII through SSVII to the input terminal 7' of the auxiliary start-stop circuit VS, so that this auxiliary circuit VS now is shut off or changes its state to its negative or rest condition. This change of the circuit VS, immediately applies a negative potential from its output terminal 4' through conductor 41 to the rectifier G5, while a negative potential is still being applied via the delay circuit of condenser C17 and resistance R57 through conductor 60 and rectifier G3 to junction *a* and the other rectifier G4 of the junction *b*. With all positive potentials now removed from the junction *b* connected to the input of the start-stop circuit SSS, this circuit SSS is shut off and remains shut off at least as long as the negative charge is delayed in the delay circuit of condenser C17. The shutting off of the start-stop circuit SSS correspondingly and immediately shuts off the generator G (see section II–3) so that the whole system is now shut off and in its rest condition until a new separate start element signal S is applied to its input terminal S'. The length of time or duration of the last and stop element of the signal being transmitted, may be determined by varying the condenser C17, which in effect also determines the length of the signal as a whole. This condenser C17 thus has the same effect on the signal communicated by the system as the condenser C6 in Fig. 8 of the receiver system described above in section III–4.

The other parts of the transmitter system shown in Figs. 10 and 10' which do not have reference characters have the same function as the corresponding parts shown and described in the receiver system or in the component circuits section II above.

While there is described above the principles of this invention in connection with specific apparatus, it is to be clearly understood that this description is made only by way of example and not as a limitation to the scope of this invention.

While I have illustrated and described what I regard to be the preferred embodiment of my invention, nevertheless it will be understood that such is merely exemplary and that numerous modifications and rearrangements may be made therein without departing from the essence of the invention, I claim:

1. In a communication system for multi-element stop-start code signals, said system comprising a series of memory devices each having two possible states of equilibrium which states may correspond to the stop-start conditions of the different elements in said code signal, the improvement comprising: an impulse generator, means to start said impulse generator, means connected to said generator for conditioning the state of an end memory device of said series by the first impulse from said generator, means connecting said end memory device to the other memory devices in said series for conditioning the states of all of said other memory devices in response to the conditioning of said end memory device by the first impulse from said generator, means connecting said impulse generator with all of said memory devices for shifting the states of said memory devices successively through said series of memory devices from said end memory device by the following impulses from said impulse generator, and means responsive to a given state of at least said end memory device for stopping said generator at the end of each signal after all of the elements of each signal have been shifted through said series of memory devices.

2. A system according to claim 1 wherein said conditioning and shifting means each include gating means, each gating means comprising at least two rectifiers on a conductor with a junction between them, and means for controlling the potential at said junction.

3. A system according to claim 1 wherein said shifting means includes a delay circuit connected to each of said memory devices.

4. A system according to claim 1 wherein said shifting means includes a bi-stable double output electronic trigger circuit.

5. A system according to claim 1 wherein said impulse generator comprises a multi-vibrator circuit having an oscillating cycle substantially equal to the repetition rate of the elements in said signal.

6. A system according to claim 5 including means for adjusting the oscillation rate of said multi-vibrator.

7. A system according to claim 1 including means for synchronizing the production of said impulses by said impulse generator to that of the centers of the elements of said signal.

8. A system according to claim 1 including means to prevent successive impulses from said impulse generator from effecting said end memory device.

9. A system according to claim 1 including means to prevent said first impulse from effecting said shifting means.

10. A system according to claim 1 including means to prevent successive impulses from said impulse generator from effecting said end memory device, and means to prevent said first impulse from said impulse generator from effecting said shifting means.

11. A transmitter system according to claim 1 wherein said shifting means includes means for applying successively the same condition to said memory circuits when operated by said impulse generator.

12. A transmitter system according to claim 1 wherein said means for conditioning all of said other memory devices includes separate means operatively connected between said end memory device and said other memory devices for conditioning the states of each of said other memory devices corresponding to the condition of the elements of the signal to be transmitted.

13. A transmitter system according to claim 1 including means operatively connected between all of said other memory devices and said stopping device for controlling said stopping means in response to the same state of all of said other memory devices.

14. A transmitter system according to claim 1 including means operatively connected to the first memory device of said series for transmitting said signal in response to the shifting of the states of said first memory device.

15. A receiver system according to claim 1 including scanning means for successively applying conditions to said last memory device of said series corresponding to the conditions of the elements of the signals as they are received.

16. A receiver system according to claim 1 wherein said conditioning means includes means for conditioning all but the last of said series of memory devices according to the same state.

17. A receiver system according to claim 1 wherein said stopping means is connected to only one of said memory devices and is responsive to a given state of said one memory device.

18. A regenerator repeater system according to claim 1 wherein one of said memory devices includes means for automatically repeating the elements of said signals as they are received.

19. In a fully electronic communication system for multi-element start-stop code signals, with each signal comprising a start element followed by a plurality of intelligence elements, said system comprising a series of electronic bi-stable memory devices which may take stable conditions corresponding to the start-stop conditions of the different elements of said signal, the improvement comprising: an impulse generator, means to start said impulse generator in response to a start element pulse of at least a pre-determined duration, means for conditioning the state of an end memory device of said series by the first impulse from said generator, means responsive to the conditioning of said end memory device for conditioning the states of all of the other memory devices of said series, means for scanning an element of said signal controlled by said impulse generator, means for shifting the states of the said memory devices successively in one direction through said series of memory devices by the following successive impulses from said impulse generator, and the means responsive to given states of at least said end memory device for automatically stopping said generator at the end of each signal.

20. A system according to claim 19 wherein said means for starting said generator comprises a circuit having a pair of electron tubes.

21. A system according to claim 19 wherein the number of memory devices in said series corresponds to the number of elements in said signal.

22. A system according to claim 19 wherein said means for starting said generator includes means for delaying the start of said generator a pre-determined time after the beginning of said start pulse.

23. A system according to claim 22 wherein said delay means is a variable means in order to compensate for variations in the duration of time for a whole signal cycle of elements.

24. A system according to claim 19 including means connected to one of said memory devices to prevent said memory devices from taking erroneous positions before a said start pulse is applied to said system.

25. A system according to claim 24 wherein said error preventing means includes a gating means comprising at least two rectifiers connected to a junction.

26. A system according to claim 25 wherein at least one of said rectifiers is connected to and controls at least one of said memory devices.

27. In a receiver system for multi-element start-stop code signals, said system comprising a series of memory devices each having two possible states of equilibrium which states may correspond to the start-stop conditions of the different elements in said code signal, the improvement comprising: an impulse generator, means to start said impulse generator, means connected to said generator for conditioning the state of the first memory device of said series by the first impulse from said generator, means connecting said first memory device to the other memory devices in said series for conditioning the states of all said other memory devices similarly and oppositely to that of said first memory device in response to said conditioning of said first memory device, means for scanning each element of said signal into the last memory device, means connecting said impulse generator with all of said memory devices for shifting the state of said last memory device successively through said series of memory devices from said last memory device by the following impulses from said impulse generator, and means responsive to the original state of the last memory device being shifted to said first memory device for automatically stopping said generator at the end of each signal after all of the elements of each signal have been shifted into said series of memory devices.

28. A system according to claim 27 including means for operating said scanning means at substantially the centers of each element of said signal.

29. In a transmitter system for multi-element start-stop code signals, said system comprising a series of memory devices each having two possible states of equilibrium which states may correspond to the start-stop conditions of the different elements in said code signal, the improvement comprising: an impulse generator, means to start said impulse generator, means connected to said generator for conditioning the state of the last memory device of said series of memory devices by the first impulse from said generator, means connecting said last memory device to the other memory devices of said series for conditioning the states of all of said other memory devices in response to the different elements of the signal to be transmitted by said conditioning of said last memory device, means connecting said impulse generator with all of said memory devices for shifting the states of said memory devices successively through said series of memory devices from said last memory device through the first memory device by the following impulses from said impulse generator, means connected to said first memory device for successively transmitting the elements of said signal as they are shifted through said first memory devices, and means responsive to the same state of all but said first memory device for stopping said generator at the end of each signal after all of said elements of said signal have been shifted through said series of memory devices.

30. A system according to claim 27 wherein said means connecting said first memory device to the other memory devices for conditioning the states of said other memory devices conditions the states of all but said last memory device similarly to said first memory device and conditions the state of said last memory device oppositely from that of said first memory device.

31. In a communication system for multi-element stop-start code signals, said system consisting of fully electronic devices comprising a series of trigger circuit type of memory devices each having two possible states of equilibrium which states may correspond to the start-stop conditions of the different elements in said code signals, the improvement comprising: a multi-vibrator impulse generator, trigger circuit means to start said impulse generator, rectifier means connected to said generator for conditioning the state of an end memory device of said series by the first impulse from said generator, rectifier means connecting said end memory device to the other memory devices in said series for conditioning the states of all of said other memory devices in response to the condition of said end memory device by the first impulse from said generator, rectifier means connecting said impulse generator with all of said memory devices for shifting the states of said memory devices successively through said series of memory devices from said end memory device by the following impulses from said impulse generator, and rectifier means responsive to a given state of at last the end memory device for stopping the generator at the end of each signal after all the elements of each signal have been shifted through said series of memory devices.

References Cited in the file of this patent

UNITED STATES PATENTS

| | | |
|---|---|---|
| 2,595,714 | Slayton | May 6, 1952 |
| 2,612,562 | Baker | Sept. 30, 1952 |
| 2,612,563 | Dain | Sept. 30, 1952 |
| 2,649,502 | Odell | Aug. 18, 1953 |
| 2,732,428 | Dain et al. | Jan. 24, 1956 |

FOREIGN PATENTS

| | | |
|---|---|---|
| 653,867 | Great Britain | May 30, 1951 |
| 680,726 | Great Britain | Oct. 8, 1952 |